US008620388B2

(12) United States Patent
Hayakawa et al.

(10) Patent No.: US 8,620,388 B2
(45) Date of Patent: Dec. 31, 2013

(54) NOISE SUPPRESSING DEVICE, MOBILE PHONE, NOISE SUPPRESSING METHOD, AND RECORDING MEDIUM

(75) Inventors: Shoji Hayakawa, Kawasaki (JP); Naoshi Matsuo, Kawasaki (JP); Hiroshi Katayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 12/494,779

(22) Filed: Jun. 30, 2009

(65) Prior Publication Data

US 2010/0056227 A1 Mar. 4, 2010

(30) Foreign Application Priority Data

Aug. 27, 2008 (JP) ................................ 2008-218610

(51) Int. Cl.
*H04M 1/00* (2006.01)

(52) U.S. Cl.
USPC ... 455/569.1; 455/63.1; 455/63.4; 455/67.13; 455/569.2; 455/570; 455/575.1; 455/575.9; 370/310.2; 370/317; 379/406.01; 379/406.02

(58) Field of Classification Search
USPC .............. 455/63.1, 63.4, 67.13, 569.1, 569.2, 455/570, 575.1–575.9; 370/310.2, 317; 379/406.01–406.16
See application file for complete search history.

(56) References Cited

U.S. PATENT DOCUMENTS

| | | | | |
|---|---|---|---|---|
| 6,377,680 | B1 * | 4/2002 | Foladare et al. | 379/392.01 |
| 6,931,138 | B2 | 8/2005 | Kawamura et al. | |
| 2006/0104454 | A1 | 5/2006 | Guitarte Perez et al. | |
| 2007/0156399 | A1 | 7/2007 | Matsuo | |
| 2007/0274536 | A1 | 11/2007 | Matsuo | |

FOREIGN PATENT DOCUMENTS

| | | | |
|---|---|---|---|
| EP | 1 202 602 | A2 | 5/2002 |
| EP | 1 667 113 | A2 | 6/2006 |
| JP | 2002-204493 | | 7/2002 |
| JP | 2004-228920 | | 8/2004 |
| JP | 2005-148163 | | 6/2005 |
| JP | 2007-183306 | | 7/2007 |
| JP | 2007-318528 | | 12/2007 |
| WO | 2007/110807 | A2 | 10/2007 |
| WO | 2009/069184 | A1 | 6/2009 |

OTHER PUBLICATIONS

European Office Action mailed Sep. 11 and issued in corresponding European Patent Application 09161566.6.

(Continued)

*Primary Examiner* — Steve D Agosta
(74) *Attorney, Agent, or Firm* — Staas & Halsey LLP

(57) ABSTRACT

A noise suppressing device receives sound signals through a plurality of sound-receiving units and suppresses noise components included in the input sound signals. The noise suppressing device includes a detecting unit which detects a usage pattern of the noise suppressing device from a plurality of usage patterns in which positional relationships of the plurality of sound-receiving units and/or positional relationships between the plurality of sound-receiving units and a target sound source are different from each other, a converting unit which converts using environment information used in a noise suppressing process to each of the sound signals inputted by the plurality of sound-receiving units into using environment information in accordance with a usage pattern detected by the detecting unit and a suppressing unit which performs the noise suppressing process using the using environment information converted by the converting unit to the sound signals.

9 Claims, 24 Drawing Sheets

(56) References Cited

OTHER PUBLICATIONS

Kaneda Yutaka, "Applications of Digital Filters to Microphone Systems-Techniques for reducing undesired sound", Acoustical Science and Technology, vol. 45, No. 2, 1989, pp. 125-128 (English translation only, pp. 1-9).

Japanese Office Action mailed Jul. 3, 2012 issued in corresponding Japanese Patent Application No. 2008-218610.

* cited by examiner

NOISE SUPPRESSING DEVICE, MOBILE PHONE, NOISE SUPPRESSING METHOD, AND RECORDING MEDIUM

CROSS-REFERENCE TO RELATED APPLICATIONS

This application is based upon and claims the benefit of priority of the prior Japanese Patent Application No. 2008-218610, filed on Aug. 27, 2008, the entire contents of which are incorporated herein by reference.

FIELD

The present application relates a noise suppressing device which suppresses a noise component included in a sound signal obtained by receiving sound, a mobile phone including the noise suppressing device, a noise suppressing method, and a recording medium.

BACKGROUND

A microphone array device including a plurality of sound-receiving units such as condenser microphones which convert received acoustic sounds into sound signals to output the sound signals and which performs various sound processing operations based on the sound signals outputted from the sound-receiving units is developed. The microphone array device may be configured to perform a delay-and-sum process which synchronously adds the sound signals outputted from the sound-receiving units to relatively emphasize a target sound more greatly than noise (improve SNR (Signal to Noise Ratio)). The microphone array device may also be configured to suppress noise by a synchronous subtracting process which synchronizes the sound signals with each other to subtract the other sound signal from one sound signal so as to form a dead space with reference to a noise sound (for example, see Yutaka Kaneda, "Applications of digital filters to microphone systems", The Journal of the Acoustical Society of Japan 45(2), pp. 125-128, 1989).

As in the delay-and-sum process, the synchronous subtracting process, or the like, a microphone array process performed by a microphone array device is a process depending on a status such as a positional relationship between both a plurality of sound-receiving units and a target sound source and an arrangement of a plurality of sound-receiving units. The positional relationship between both the sound-receiving units and the target sound source includes, for example, a positional relationship obtained when the plurality of sound-receiving units are arranged in a direction perpendicular to a direction to the target sound source, a positional relationship obtained when the plurality of sound-receiving units are arranged on a straight line in a direction to the target sound source, and the like. The arrangement of the plurality of sound-receiving units includes distances between the plurality of sound-receiving units, holes to the sound-receiving units, and the like.

More specifically, in the microphone array process, when a status such as a positional relationship between a sound-receiving unit and a target sound source or an arrangement of the plurality of sound-receiving units changes, various processes or parameters used in the various processes needs be sequentially switched.

A recent foldable mobile phone is configured to be capable of being used (telephone call or communication) in a plurality of usage patterns such as a normal style in an unfolded state or a viewer style in which a display screen faces outside (surface) in folding. In most foldable mobile phones, a first housing provided with a display screen and a second housing provided with operation buttons are connected to each other through a hinge portion, and a loud speaker is provided on an end portion opposing a connection portion to the hinge portion of the first housing. Therefore, in such a mobile phone, one microphone is frequently mounted near the hinge portion to prevent the microphone in the viewer style from being excessively close to the loud speaker.

In the mobile phone in which a microphone is arranged near the hinge portion, a position of user's (speaker's) mouth is separated from a position of the microphone, in use in the normal style or in use in the viewer style, an SNR of speech sound decreases, and speech quality is deteriorated. For this reason, a noise suppressing process such as a microphone array process which increases an SNR needs be performed.

As described above, in the microphone array process, when a using state (usage pattern) of a mobile phone is changed, various processes or parameters used in various processes need be switched. Therefore, when the microphone array process is configured to be performed in all of the usage patterns such as the normal style and the viewer style, microphone array processing units corresponding to the usage patterns may be independently prepared, and the microphone array processing units which are operated depending on the usage patterns may be switched.

FIG. 24 is a block diagram showing a configuration of a conventional noise suppressing device. The conventional noise suppressing device includes a first sound input unit 101, a second sound input unit 102, a sensor 103, a housing state determining unit 104, a sound input/output switching unit 105, switches 106, 107, and 110, a first microphone array processing unit 108, a second microphone array processing unit 109, and the like.

Each of the first sound input unit 101 and the second sound input unit 102 includes a microphone and an analog/digital converter (hereinafter referred to as an A/D converter). The first sound input unit 101 and the second sound input unit 102 receive sounds through the microphones, convert the received sounds into time-series analog electric signals, amplify the electric signals through the amplifiers, convert the amplified electric signals into digital sound signals by the A/D converter, and then transmit the digital sound signals to the switches 106 and 107, respectively.

When a noise suppressing device is arranged in, for example, a foldable mobile phone, the sensor 103 is a sensor attached to a hinge portion of the mobile phone. The sensor 103 detects a state of the hinge portion depending on whether the mobile phone is in a normal style (unfolded state) or a viewer style (folded state) and transmits a detection result to the housing state determining unit 104. The housing state determining unit 104 determines whether the mobile phone is in the normal style or the viewer style based on the detection result acquired from the sensor 103, and transmits the determination result to the sound input/output switching unit 105.

The sound input/output switching unit 105 controls switching of the switches 106, 107, and 110 based on the determination result acquired from the housing state determining unit 104. For example, the sound input/output switching unit 105 controls switching of the switches 106 and 107 such that the sound signals from the first sound input unit 101 and the second sound input unit 102 are inputted from the first microphone array processing unit 108 when the determination result acquired from the housing state determining unit 104 is the normal style. At this time, the sound input/output switching unit 105 controls switching of the switch 110 such that the sound signal from the first microphone array processing unit 108 is output externally.

On the other hand, when the determination result acquired from the housing state determining unit 104 is the viewer style, the sound input/output switching unit 105 control switching of the switches 106 and 107 to output sound signals from the first sound input unit 101 and the second sound input unit 102 to the second microphone array processing unit 109. At this time, the sound input/output switching unit 105 controls switching of the switch 110 to externally output a sound signal from the second microphone array processing unit 109.

The first microphone array processing unit 108 and the second microphone array processing unit 109 acquire sound signals outputted from the switches 106 and 107 and perform a microphone array process such as a delay-and-sum process or a synchronous subtracting process based on the acquired sound signals. The first microphone array processing unit 108 performs the microphone array process performed when the mobile phone is used in the normal style, and the second microphone array processing unit 109 performs a microphone array process performed when the mobile phone is used in the viewer style.

With such a configuration, the noise suppressing device may perform a microphone array process depending on a usage pattern of the mobile phone (normal style and viewer style). Noise is appropriately suppressed by the processes depending on the usage patterns to improve sound quality.

Moreover, when the noise suppressing device is arranged in a video camcorder, proposed is a configuration in which a directivity and a recording level of a zoom microphone mounted on the video camcorder are controlled in conjunction with zoom information of the camera (see, for example, Japanese Unexamined Patent Publication No. 2002-204493).

The noise suppressing device including the above configuration switches microphone array processing units to be operated when the usage patterns of the mobile phone are changed. The microphone array processing unit controlled to start operating starts an estimating process of various pieces of information used in the microphone array process from the point of time and start a microphone array process based on the estimated information. Therefore, until appropriate information used for a microphone array process is estimated, the microphone array process based on inappropriate information (for example, preset initial information) is performed. For this reason, the noise suppressing process operates unstably. In particular, when the usage patterns are switched in use of the mobile phone (telephone call), uncomfortable sound processed by the unstable operation is disadvantageously sent to the intended party.

SUMMARY

According to an aspect of the invention, a noise suppressing device which receives sound signals through a plurality of sound-receiving units and suppresses noise components included in the input sound signals, includes a detecting unit which detects a usage pattern of the noise suppressing device from a plurality of usage patterns in which positional relationships of the plurality of sound-receiving units and/or positional relationships between the plurality of sound-receiving units and a target sound source are different from each other, a converting unit which converts using environment information used in a noise suppressing process to each of the sound signals inputted by the plurality of sound-receiving units into using environment information in accordance with a usage pattern detected by the detecting unit; and a suppressing unit which performs the noise suppressing process using the using environment information converted by the converting unit to the sound signals.

The object and advantages of the invention will be realized and attained by means of the elements and combinations particularly pointed out in the claims.

It is to be understood that both the foregoing general description and the following detailed description are exemplary and explanatory and are not respective of the invention, as claimed.

DESCRIPTION OF EMBODIMENTS

A noise suppressing device disclosed in the present application will be described below with reference to the drawings depicting embodiments applied to a mobile phone. A noise suppressing device, a noise suppressing method, and a computer program disclosed in the present application may be applied to not only configurations applied to a mobile phone, but also, for example, a sound processing device that performs various processes to an obtained sound signal, such as a speech recognition device which performs speech recognition by using a speech signal obtained by receiving a sound.

Embodiment 1

Figure 1A:
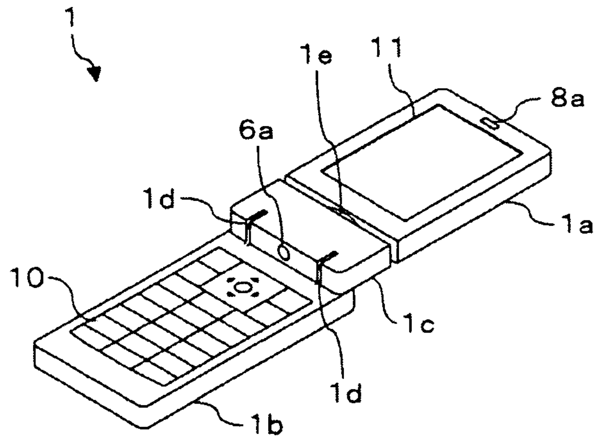
FIGS. 1A, 1B and 1C are schematic diagrams depicting an example of a configuration of a mobile phone according to Embodiment 1.
Figure 1B:
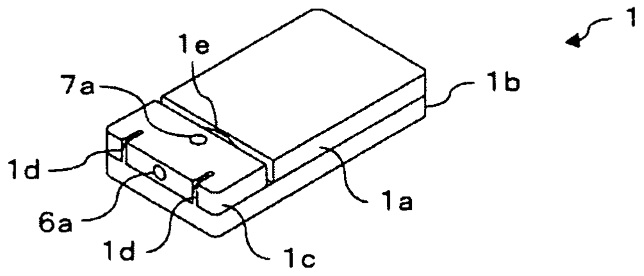
Figure 1C:
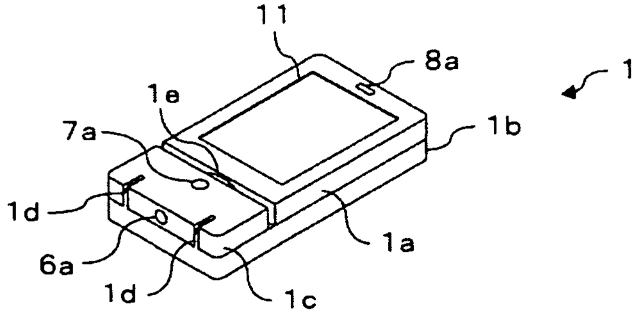

A mobile phone according to Embodiment 1 will be described below. FIGS. 1A, 1B and 1C are schematic diagrams depicting a configuration of a mobile phone according to Embodiment 1. A mobile phone 1 according to Embodiment 1 is a foldable mobile phone. FIG. 1A depicts an external perspective view of the mobile phone 1 which is not folded, FIG. 1B depicts an external perspective view of the mobile phone 1 which is folded to cause a display unit 11 to face inside, and FIG. 1C depicts an external perspective view of the mobile phone 1 which is folded to cause the display unit 11 to face outside.

The mobile phone 1 according to Embodiment 1 includes a first housing 1*a* including the display unit 11, a second housing 1*b* including an operation unit 10, and a third housing 1*c* to connect the housings 1*a* and 1*b*. The housings 1*b* and 1*c* are connected through hinge portions 1*d*, and the housings 1*a* and 1*c* are connected through a pivotal portion 1*e*.

The first housing 1*a* may be configured to be able to pivot at 180° with respect to the pivotal portion 1*e*. When the mobile phone 1 is folded, the state may be changed into a state in which the display unit 11 faces the operation unit 10 and a state in which the display unit 11 does not face the operation unit 10. The housings 1*a* and 1*c* are configured to be foldable at the hinge portions 1*d* with respect to the housing 1*b*. As a mobile phone to which the noise suppressing device disclosed in the present application may be applied, not only a foldable mobile phone but also any mobile phone that may be used in a plurality of usage patterns including shapes of housings or using states of a microphone.

The mobile phone 1 includes a loud speaker 8*a* at an end portion on an opposite side of the connection position between the housing 1*a* and the pivotal portion 1*e*. The mobile phone 1 includes a microphone 6*a* on a side surface of the connection position between the hinge portions 1*d* of the housing 1*c*, and includes a microphone 7*a* on an opposite surface facing the operation unit 10 when the mobile phone 1 is folded.

The mobile phone 1 according to Embodiment 1 may be used in a usage pattern (also called a normal style) in which a user performs a speech act, as depicted in FIG. 1A, by setting the loud speaker 8*a* arranged on the housing 1*a* near his/her ear in an unfolded state. The mobile phone 1 according to Embodiment 1 may also be used in a usage pattern (also called a viewer style) in which a user performs a speech act, as depicted in FIG. 1C, by setting the loud speaker 8*a* near his/her ear in a folded state in which the display unit 11 faces outside.

Figure 2:
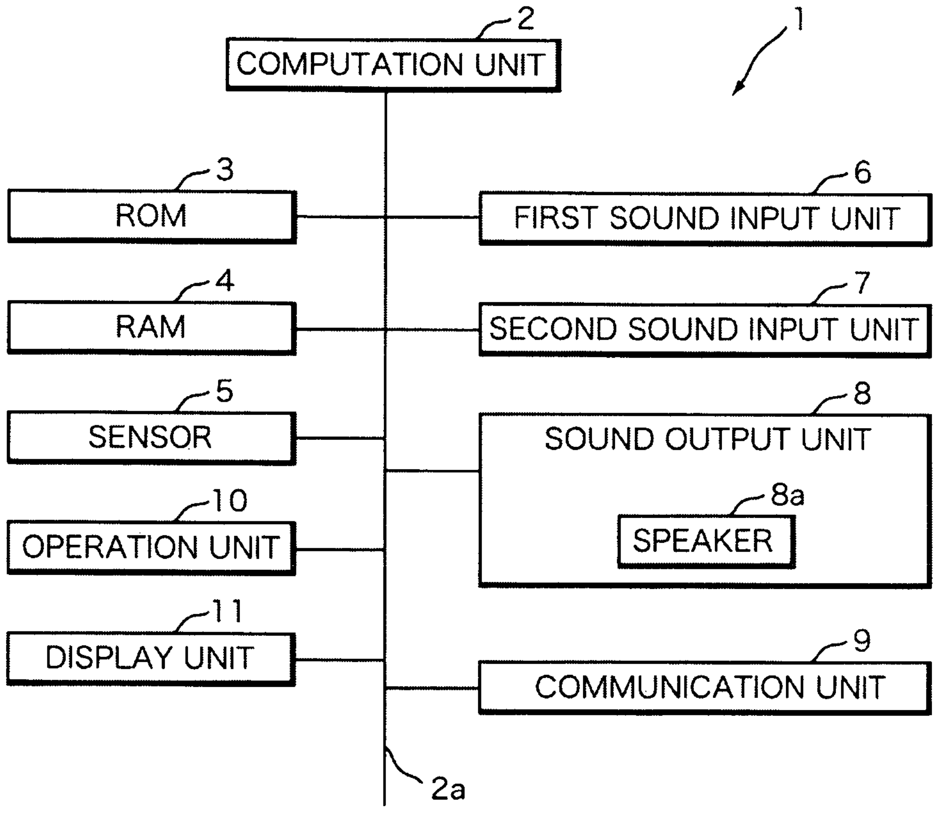
FIG. 2 is a block diagram depicting an example of a configuration of the mobile phone according to Embodiment 1.

FIG. 2 is a block diagram depicting a configuration of the mobile phone 1 according to Embodiment 1. The mobile phone 1 according to Embodiment 1 includes a computation unit 2, a ROM (Read Only Memory) 3, a RAM (Random Access Memory) 4, a sensor 5, a first sound input unit 6, a second sound input unit 7, a sound output unit 8, a communication unit 9, an operation unit 10, a display unit 11, and the like. The hardware units described above are connected to each other through a data bus 2*a*.

The computation unit 2 may be a CPU (Central Processing Unit), an MPU (Micro Processor Unit), or the like, and controls operations of the hardware units, and arbitrarily reads a control program stored in the ROM 3 in advance onto the RAM 4 to execute the control program. The ROM 3 stores various control programs required to operate the mobile phone 1. The RAM 4 may be an SRAM, a flash memory, or the like and temporarily stores various data generated in execution of the control program by the computation unit 2.

The sensor 5 is attached to the hinge portions 1*d*, and detects whether the mobile phone 1 is unfolded (normal style) or folded (viewer style) through the hinge portions 1*d*. The sensor 5 outputs a detection result obtained depending on whether the mobile phone 1 is set in the normal style or the viewer style based on magnetic information obtained by magnets arranged on the hinge portions 1*d*.

Figure 3:
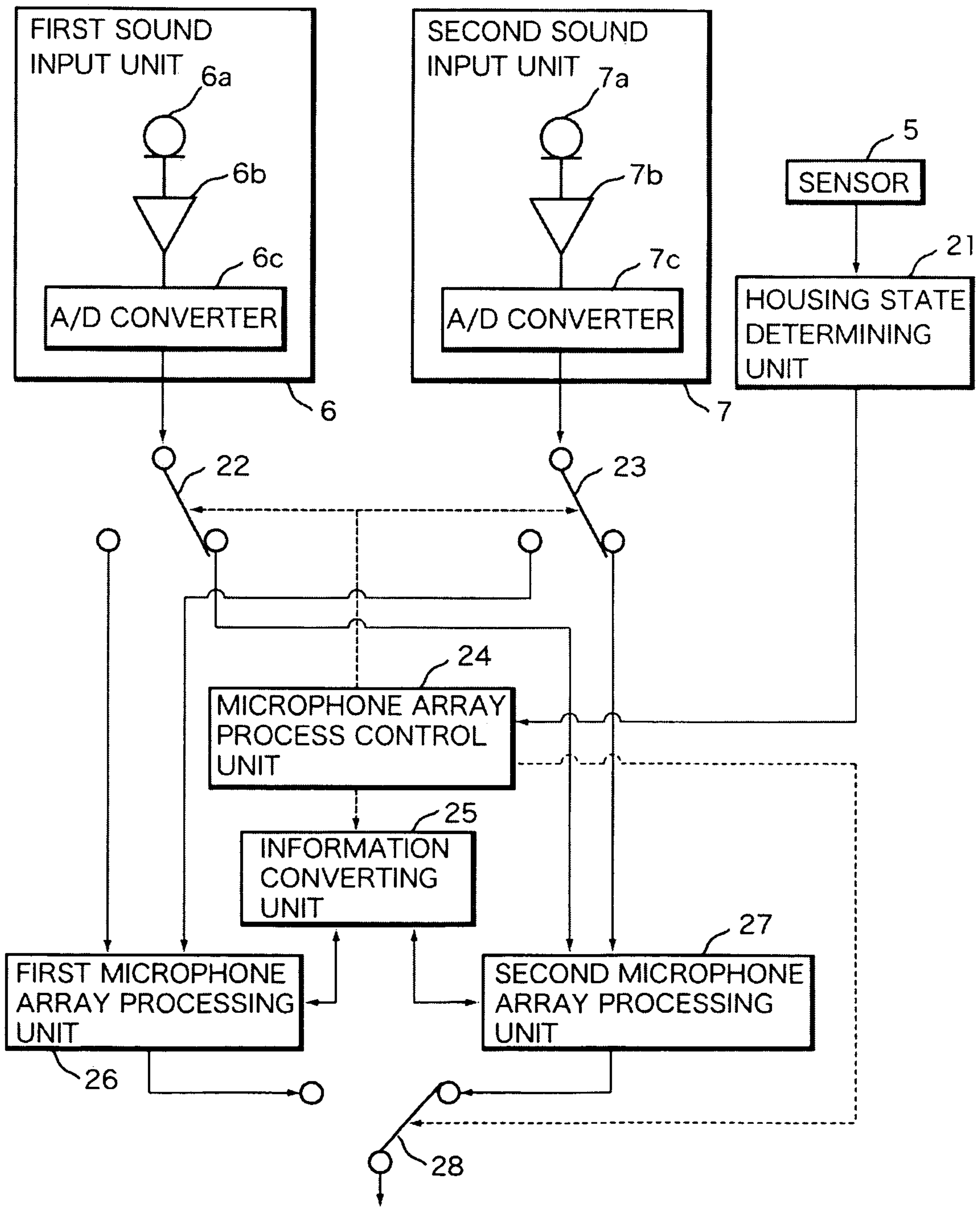
FIG. 3 is a functional block diagram depicting an example of a functional configuration of the mobile phone according to Embodiment 1.

The first sound input unit 6 and the second sound input unit 7 (sound-receiving unit), as depicted in FIG. 3, each have microphones 6*a* and 7*a*, amplifiers 6*b* and 7*b*, and A/D converters 6*c* and 7*c*. The microphones 6*a* and 7*a* are, for example, condenser microphones, which generate analog sound signals based on received sounds, and send the generated sound signals to the amplifiers 6*b* and 7*b*, respectively.

The amplifiers 6*b* and 7*b* are, for example, gain amplifiers, which amplify the sound signals inputted from the microphones 6*a* and 7*a*, and send the obtained sound signals to the A/D converters 6*c* and 7*c*, respectively. The A/D converters 6*c* and 7*c* perform sampling to the sound signals inputted from the amplifiers 6*b* and 7*b* by using a filter such as an LPF (Low Pass Filter) at a sampling frequency of 8000 Hz in a mobile phone to convert the sound signals into digital sound signals. The first sound input unit 6 and the second sound input unit 7 send the digital sound signals obtained by the A/D converters 6*c* and 7*c* to a given destination.

The sound output unit 8 includes the loud speaker 8*a* which outputs sound, a digital/analog converter, an amplifier (both of them are not depicted), and the like. The sound output unit 8 converts a digital sound signal to be output as a sound into an analog sound signal by the digital/analog converter, amplifies the analog sound signal by the amplifier, and outputs a sound based on the amplified sound signal from the loud speaker 8*a*.

The communication unit 9 is an interface to be connected to a network (not depicted) and performs communication with an external device such as another mobile phone or a computer through a network (communication line). The communication unit 9, for example, outputs the sound signals acquired by the first sound input unit 6 or the second sound input unit 7 to a mobile phone of a communicate (intended party).

The operation unit 10 includes various operation keys required by a user to operate the mobile phone 1. When the operation key is operated by the user, the operation unit 10 transmits a control signal corresponding to the operated operation key to the computation unit 2, and the computation unit 2 executes a process corresponding to the control signal acquired from the operation unit 10.

The display unit 11 is, for example, a liquid crystal display (LCD), and displays an operation status of the mobile phone 1, information input through the operation unit 10, information to be informed to the user, and the like according to an instruction from the computation unit 2.

In the mobile phone 1 including the above configuration, functions of the mobile phone 1 realized by causing the computation unit 2 to execute the various control programs stored in the ROM 3 will be described below. FIG. 3 is a functional block diagram depicting a functional configuration of the mobile phone 1 according to Embodiment 1. In the mobile phone 1 according to Embodiment 1, the computation unit 2 executes the control programs stored in the ROM 3 to realize functions such as a housing state determining unit 21, switches 22, 23, and 28, a microphone array process control unit 24, an information converting unit 25, a first microphone array processing unit 26, and a second microphone array processing unit 27.

The functions described above are not limited to configurations realized by causing the computation unit 2 to execute the control programs stored in the ROM 3. For example, the functions described above may be realized by a DSP (Digital Signal Processor) in which a computer program and various data disclosed in the present application are incorporated.

The first sound input unit 6 and the second sound input unit 7 transmit sound signals obtained by receiving sounds to the switches 22 and 23. The first sound input unit 6 and the second sound input unit 7 receives sounds including a sound (target sound) uttered from a mouth of a speaker serving as a target sound source and other sounds (noise) coming from the surrounding to the mobile phone 1.

The switches 22 and 23 transmit sound signals inputted from the first sound input unit 6 and the second sound input unit 7 to one of the first microphone array processing unit 26 and the second microphone array processing unit 27. Each of the first microphone array processing unit 26 and the second microphone array processing unit 27 (suppressing unit) transmits the sound signal subjected to the microphone array process to the switch 28. The switch 28 transmits the sound signal inputted from one of the first microphone array processing unit 26 and the second microphone array processing unit 27 to a given destination. The detailed configurations of the first microphone array processing unit 26 and the second microphone array processing unit 27 will be described below with reference to FIG. 4.

The housing state determining unit (detection unit) 21 determines, based on a detection result outputted from the sensor 5, whether the mobile phone 1 set in the normal style or the viewer style and notifies the microphone array process control unit 24 of a determination result.

When the housing state determining unit 21 notifies the microphone array process control unit 24 of the determination result indicating that the mobile phone 1 is set in the normal style, the microphone array process control unit 24 controls selection of the switches 22 and 23 to transmit sound signals from the sound input units 6 and 7 to the first microphone array processing unit 26. At this time, the microphone array process control unit 24 controls selection of the switch 28 to transmit a sound signal from the first microphone array processing unit 26 to a given destination.

On the other hand, when the housing state determining unit 21 notifies the microphone array process control unit 24 of the determination result indicating that the mobile phone 1 is set in the viewer style, the microphone array process control unit 24 controls selection of the switches 22 and 23 to transmit the sound signals from the sound input units 6 and 7 to the second microphone array processing unit 27. At this time, the microphone array process control unit 24 controls selection of the switch 28 to transmit a sound from the second microphone array processing unit 27 to a given destination.

Furthermore, the microphone array process control unit 24 controls an operation of the information converting unit 25 based on the determination result notified from the housing state determining unit 21. More specifically, when the mobile phone 1 is set in the normal style, the information converting unit 25 is instructed by the microphone array process control unit 24 to convert using environment information used by the second microphone array processing unit 27 into using environment information used by the first microphone array processing unit 26. When the mobile phone 1 is set in the viewer style, the information converting unit 25 is instructed by the microphone array process control unit 24 to convert using environment information used in the first microphone array processing unit 26 into using environment information used in the second microphone array processing unit 27.

The information converting unit (converting unit) 25 performs a conversion process between the using environment information used in the first microphone array processing unit 26 and the using environment information used in the second microphone array processing unit 27 according to an instruction from the microphone array process control unit 24. In Embodiment 1, both the first microphone array processing unit 26 and the second microphone array processing unit 27 are configured to perform microphone array processes based on the sound signals obtained by receiving sounds through the two microphones 6*a* and 7*a*. Therefore, the information converting unit 25 may be configured to simply exchange the using environment information used in the first microphone array processing unit 26 and the using environment information used in the second microphone array processing unit 27.

Figure 4:
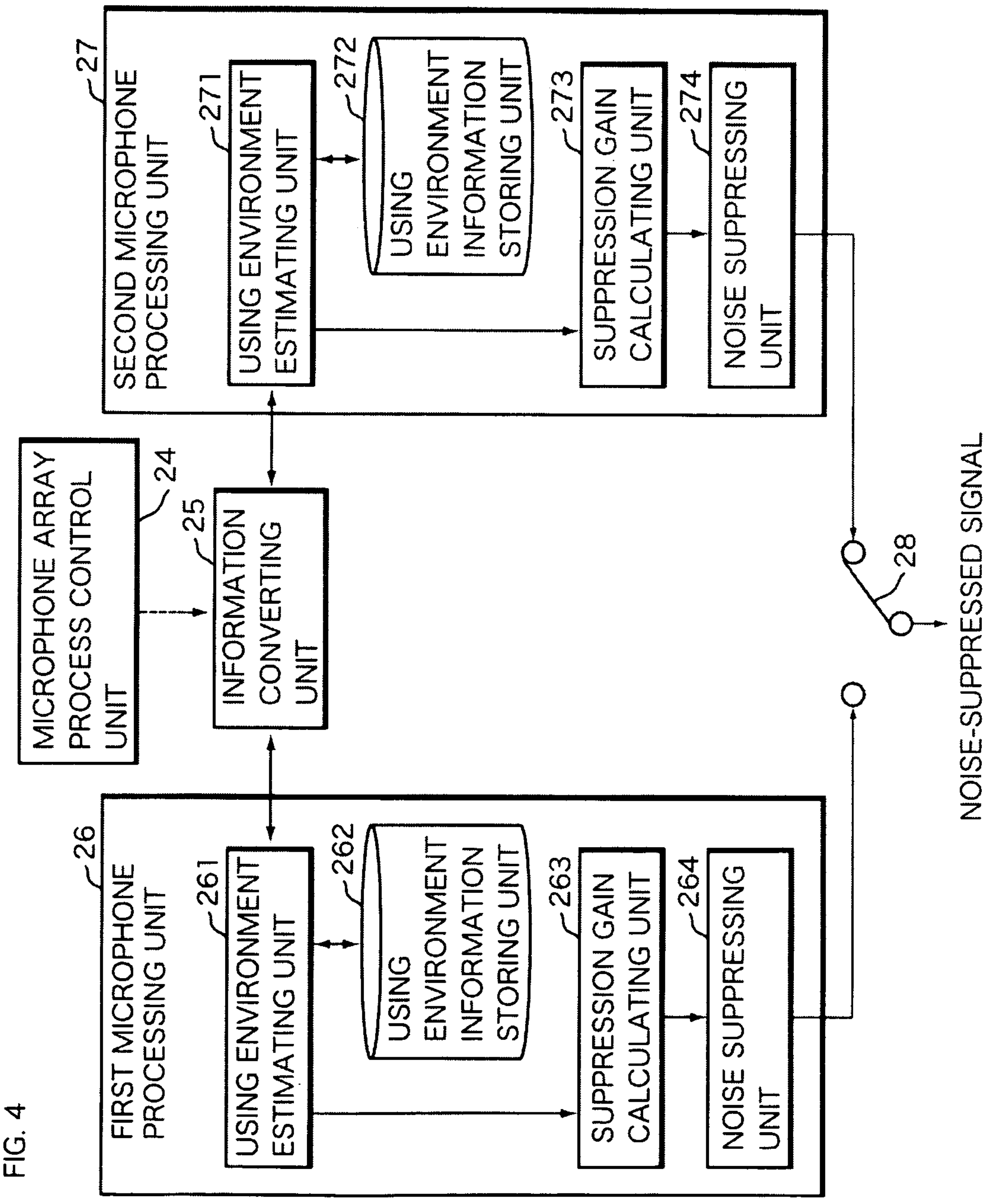
FIG. 4 is a functional block diagram depicting an example of a functional configuration of a microphone array processing unit.

Example of detailed configurations of the first microphone array processing unit 26 and the second microphone array processing unit 27 will be described below. FIG. 4 is a functional block diagram depicting functional configurations of the second microphone array processing units 26 and 27. In the mobile phone 1 according to Embodiment 1, each of the first microphone array processing unit 26 and the second microphone array processing unit 27 have functions of using environment estimating units 261 and 271, using environment information storing units 262 and 272, suppression gain calculating units 263 and 273, noise suppressing units 264 and 274, and the like.

Although not depicted in the figure, the first microphone array processing unit 26 and the second microphone array processing unit 27 have a framing processing unit and a signal converting unit. The framing processing unit performs a framing process to convert sound signals on a time axis into sound signals on a frequency axis with respect to sound signals inputted from the first sound input unit 6 and the second sound input unit 7. In the framing process, for example, a frame length of 32 ms is processed as one block, and a section having 32 ms and shifted by a frame shift of 20 ms is processed as a new frame. The shift is repeated to advance the process. The frame length and the amount of frame shift are not limited to 32 ms and 20 ms.

The signal converting unit converts (in a mobile telephone, 256 points in 8 kHz sampling) a sound signal on a time axis into a sound signal (spectrum) on a frequency axis with respect to a sound signal subjected to the framing process to obtain a complex spectrum of both the microphone 6*a* and the microphone 7*a*. The signal converting unit transmits the obtained complex spectra to the using environment estimating units 261 and 271 and the noise suppressing units 264 and 274. The signal converting unit executes, for example, a time-frequency conversion process such as a fast Fourier transformation (FFT).

The using environment estimating units (estimating units) 261 and 271 perform estimating processes for various pieces of using environment information used in noise suppressing processes performed by the microphone array processing units 26 and 27 and store the estimated using environment information in the using environment information storing units 262 and 272. As the using environment information storing units 262 and 272, for example, a given region of the RAM 4 or an additionally arranged memory unit may be used.

The using environment estimating units 261 and 271 calculate various pieces of using environment information by using, for example, the complex spectrum acquired from the signal and a phase difference spectrum between the microphone 6*a* and the microphone 7*a*. In this case, the suppression gain calculating units 263 and 273 determine a suppression gain based on the calculated using environment information and the phase difference spectrum, and the noise suppressing units 264 and 274 perform a noise suppressing process based on the determined suppression gain. In this manner, an appropriate directivity may be formed, and a sound signal emphasizing a sound coming from a target sound source is generated based on the sound signals acquired by the first sound input unit 6 and the second sound input unit 7.

Figure 5A:
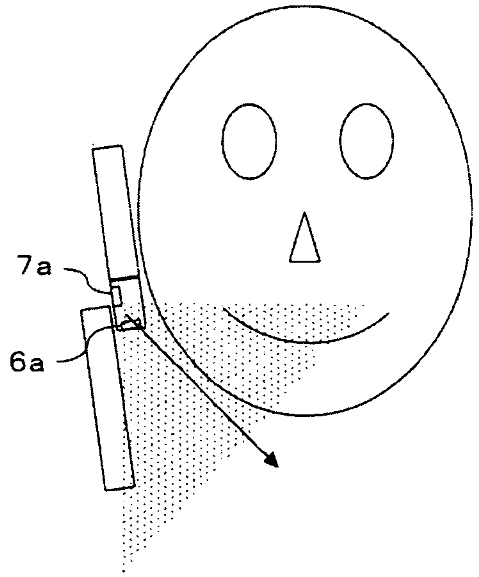
FIGS. 5A and 5B are schematic diagrams each depicting an example of a pattern of directivity in the mobile phone according to Embodiment 1.
Figure 5B:
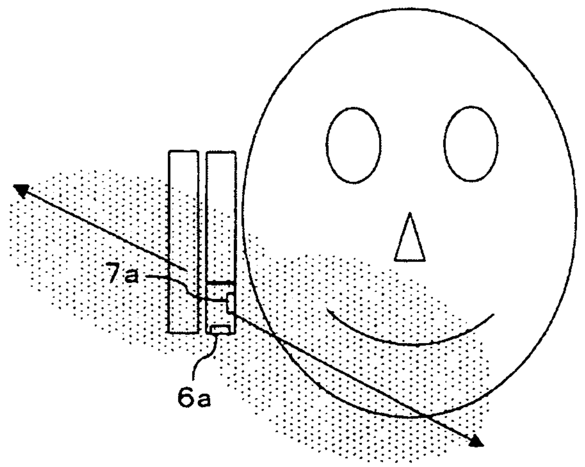

FIGS. 5A and 5B are schematic diagrams each depicting a pattern of directivity in the mobile phone 1 according to Embodiment 1. In the mobile phone 1 according to Embodiment 1, the microphone 6*a* is arranged near the hinge portions 1*d* such that in the normal style, the microphone 6*a* is arranged on the operation unit 10 side as depicted in FIG. 1A and, in the viewer style, the hole to the microphone 6*a* is arranged outside as depicted in FIG. 1C. In the mobile phone 1, in the viewer style, the sound hole of the microphone 7*a* is arranged outside the housing 1*c* as depicted in FIG. 1C.

With such a configuration, in the mobile phone 1 according to Embodiment 1, in the normal style, a sound including a directivity pattern as depicted in FIG. 5A may be received. In the viewer style, a sound having a directivity pattern as depicted in FIG. 5B may be received. The directivity pattern depicted in FIG. 5A is a cone-shaped directivity pattern including a line connecting the two microphones 7*a* and 6*a* to each other as a center line. In this directivity pattern, noise suppression is performed such that a dead space of directivity is formed on a side surface side on which the microphone 7*a* is arranged. The directivity pattern depicted in FIG. 5B is a disk-shaped directivity pattern. In this directivity pattern, noise suppression is performed such that a dead space of directivity is formed in a direction orthogonal to a direction from a target sound source (mouth of a speaker) to the microphones 6*a* and 7*a*.

Therefore, in the mobile phone 1 according to Embodiment 1, in any one of the normal style and the viewer style, directive sound receiving by a microphone array may be realized. The first microphone array processing unit 26 and the second microphone array processing unit 27 further include signal recovering units (not depicted). The signal recovering units convert sound signals subjected to a noise suppressing process by the noise suppressing units 264 and 274 and plotted on the frequency axis into sound signals on the time axis to transmit the sound signals to the switch 28. The signal recovering units execute an inverse conversion process of the conversion process performed by the signal converting unit, for example, an Inverse Fast Fourier transforming process (an IFFT process).

When the sound signals acquired by, for example, the sound input units 6 and 7 are transmitted to a mobile phone of an intended party, the switch 28 transmits a noise-suppressed sound signal acquired from the first microphone array processing unit 26 or the second microphone array processing unit 27 to the communication unit 9. The communication unit 9 transmits the acquired sound signal to a terminal of the intended party as telephone communication. When the mobile phone 1 has a configuration including a speech recognition processing unit and performs a speech recognition process based on the sound signals acquired by the sound input units 6 and 7, the switch 28 transmits the noise-suppressed sound signal to the speech recognition processing unit.

The using environment estimating units 261 and 271 of the microphone array processing units 26 and 27 estimate, for example, a background noise level, statistics values of a background noise spectrum, an S/N ratio (SNR), information representing a speech section/noise section, information representing noise frequency band, direction information representing a direction to a given sound source (mouth of a speaker), direction information representing a direction to a noise source, correction values (microphone sensitivity correction values) to correct the sensitivities of the microphones 6*a* and 7*a*, and the like as using environment information.

The background noise level indicates a level of a relatively steady noise component included in the sound signals received by the microphones 6*a* and 7*a*. The background noise level may be estimated and updated by calculating a coming direction of the sound from the phase difference spectrum calculated by the microphones 6*a* and 7*a* and using signals coming from directions except for the direction to the given sound source. The background noise level estimated by the above process is a noise level based on a sound coming from a side surface side on which the microphone 7*a* is arranged. The microphone array processing units 26 and 27 perform a noise suppressing process based on the background noise level to make it possible to realize a directivity depending on a level of surrounding noise.

Figure 6:
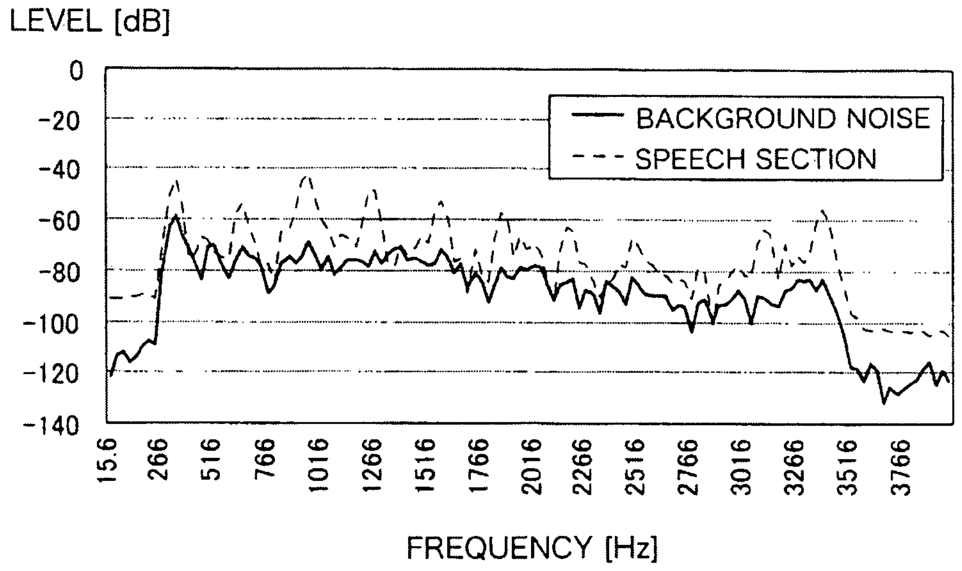
FIG. 6 is a schematic diagram depicting an example of a background noise spectrum and a spectrum in a speech section.

The background noise spectrum indicates an average level of frequency components of noise components included in the sound signals received by the microphones 6*a* and 7*a*. The background noise spectrum may be estimated and updated by calculating a coming direction of a sound from a phase difference spectrum calculated by the microphones 6*a* and 7*a* and using signals coming from directions except for a direction to the given sound source. FIG. 6 is a schematic diagram depicting an example of the background noise spectrum and a spectrum in a speech section. FIG. 6 depicts the background noise spectrum and the spectrum in the speech section such that the abscissa is set as a frequency and the ordinate is set as a level (sound intensity).

The first microphone array processing units 26 and the second microphone array processing unit 27, for example, as in a technique disclosed in Japanese Unexamined Patent Publication No. 2007-183306, perform a noise suppressing process based on the background noise spectrum to determine a maximum amount of suppression by using the value of the background noise spectrum as a target, so that musical noise (squealing sound) may be suppressed.

The SNR is information of sound intensity level of voice uttered by a user with respect to the background noise level.

The SNR is calculated by calculating a ratio of a power ($P_{input}$) of a sound signal obtained after the noise suppressing process performed by the noise suppressing units 264 and 274 and a power ($P_{noise}$) of an average noise obtained after the noise suppressing process. For example, the following equation 1 may be used. The microphone array processing units 26 and 27 may perform a microphone array process including an appropriate balance between an amount of suppression and sound quality by performing a noise suppressing process based on the SNR.

$$SNR[dB]=10\log_{10}(P_{input}/P_{noise}) \quad \text{(Equation 1)}$$

The speech section and the noise section are a section in which the sound signals received by the microphones 6*a* and 7*a* include a sound (target sound) from the target sound source and a section in which the sound signals do not include the target sound. As a method of determining whether the section includes the target sound, known are a method of determining that the target sound is not received when the phase different spectrum of the acquired sound signals is random, a method of using a difference between a noise level estimated by setting the directivity in a direction not including a direction to the target sound source and a level of an input sound (SNR), and the like. The microphone array processing units 26 and 27 may estimate and update the background noise level and the background noise spectrum by using a sound signal in the noise section based on information representing the speech section/noise section.

The information representing noise frequency band is information representing frequencies of noise components included in the sound signals received by the microphones 6*a* and 7*a*. As the noise frequency band, frequency bands of sounds coming from direction different from a direction to the given sound source is estimated by using, for example, the phase difference spectrum. The microphone array processing units 26 and 27 may estimate and update the background noise level and the background noise spectrum based on the information representing the noise band by using the noise components included in the sound signals received by the microphones 6*a* and 7*a*.

As direction information representing a direction to a given sound source (mouth of a speaker), the direction to the given sound source may be estimated from an inclination of a frequency axial direction of the phase difference spectrum based on the information of the phase difference spectrum in the speech section of the sound signals received by the microphones 6*a* and 7*a*.

As the direction information representing a direction to a noise source, the direction to the noise source may be estimated from the inclination of the frequency axial direction of the phase difference spectrum based on the information of the phase difference spectrum in the noise section of the sound signals received by the microphones 6*a* and 7*a*.

Correction values (microphone sensitivity correction values) for correcting the sensitivities of the microphones 6*a* and 7*a* are estimated based on a ratio of average spectra estimated in the noise sections of the sound signals received by the microphones 6*a* and 7*a*. Even in microphone parts of the same type, variations in sensitivity of ±3 dB or more frequently occur. The microphone array processing units 26 and 27 correct a level (signal value) difference between sound signals caused by a difference between the sensitivities of the microphones 6*a* and 7*a* on the basis of the microphone sensitivity correction value.

In this case, the information converting unit 25 according to Embodiment 1, as described above, is configured to use the pieces of using environment information estimated and stored by the microphone array processing units 26 and 27 in other microphone array processing units 26 and 27. More specifically, the information converting unit 25 is notified when the usage pattern of the mobile phone 1 (normal style or viewer style) is changed. When the information converting unit 25 is notified of a change in usage pattern of the mobile phone 1, the information converting unit 25 gives the using environment information stored in the using environment information storing unit 262 (or 272) of the microphone array processing unit 26 (or 27) in the usage pattern before the usage patterns are changed to the using environment estimating unit 271 (or 261) of the microphone array processing unit 27 (or 26) in the usage pattern after the usage patterns are changed.

The microphone array processing unit 27 (or 26) in the changed usage pattern starts a microphone array process by using the using environment information acquired through the information converting unit 25 as an initial value. Therefore, even though the usage patterns of the mobile phone 1 are changed, the microphone array processing unit 27 (or 26) corresponding to the usage pattern after the usage patterns are changed may take over the using environment information estimated by the microphone array processing unit 26 (or 27) in the usage pattern before the usage patterns are changed.

Therefore, using environment information estimated in the microphone array processing unit 26 (or 27) corresponding to the usage pattern before the usage patterns are changed is not wasted. Furthermore, in the microphone array processing unit 27 (or 26) corresponding to the usage pattern after the usage patterns are changed, a noise suppressing process based on appropriate using environment information may be performed immediately after the usage patterns are switched. In this manner, immediately after the usage patterns of the mobile phone 1 are changed, the beginning of a word of user speech is prevented from being cut, and the noise suppressing process may be continuously performed with a large amount of noise suppression even at a timing at which the usage patterns are changed, so that speech quality may be maintained.

More specifically, when a background noise level or a background noise spectrum is acquired from the microphone array processing unit 27 (or 26) corresponding to the usage pattern before the usage patterns are changed, the microphone array processing unit 26 (or 27) corresponding to the usage pattern after the usage patterns are changed may perform a noise suppressing process based on an appropriate background noise level or an appropriate background noise spectrum immediately after the usage patterns are switched. Therefore, a musical noise occurring immediately after the usage patterns are switched may be prevented from being heard by an intended party.

When the microphone array processing unit 26 (or 27) corresponding to the usage pattern after the usage patterns are changed acquires an S/N ratio from the microphone array processing unit 27 (or 26) corresponding to the usage pattern before the usage patterns are changed, a microphone array process including an appropriate balance between an amount of suppression and sound quality immediately after the usage patterns are switched.

Furthermore, when the microphone array processing unit 26 (or 27) corresponding to the usage pattern after the usage patterns are changed acquires direction information of a given sound source from the microphone array processing unit 27 (or 26) corresponding to the usage pattern before the usage patterns are changed, the microphone array processing unit 26 (or 27) starts a noise suppressing process which forms a wider directivity such that a direction indicated by the acquired direction information is set as a center of directivity.

In this manner, cutting of the beginning of a word uttered by user caused by suppressing the initial part of a speech immediately after the usage patterns are switched may be prevented. Since a direction to a target sound source estimated in the usage pattern before the usage patterns are changed may be used as a hint, time required until directions to the target sound source may be reduced in comparison with estimation performed from an initial value, and the directivity may be narrowed down at an early stage to the direction to the target sound source.

Furthermore, when the microphone array processing unit 26 (or 27) corresponding to the usage pattern after the usage patterns are changed acquires a microphone sensitivity correction value from the microphone array processing unit 27 (or 26) corresponding to the usage pattern before the usage patterns are changed, a difference between the sensitivities of the microphones 6*a* and 7*a* may be corrected immediately after the usage patterns are switched.

Figure 7A:
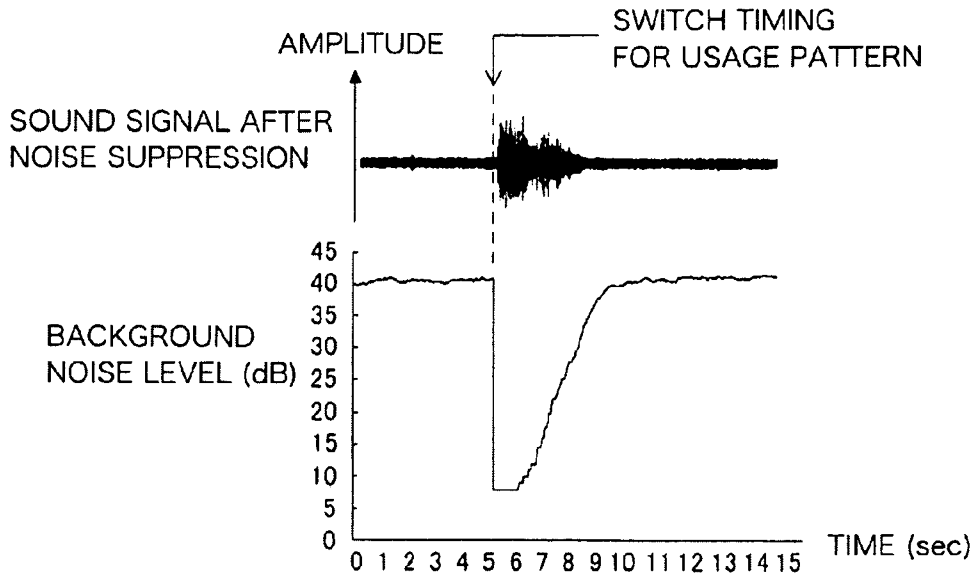
FIGS. 7A and 7B are explanatory diagrams for describing effects obtained by the mobile phone according to Embodiment 1.
Figure 7B:
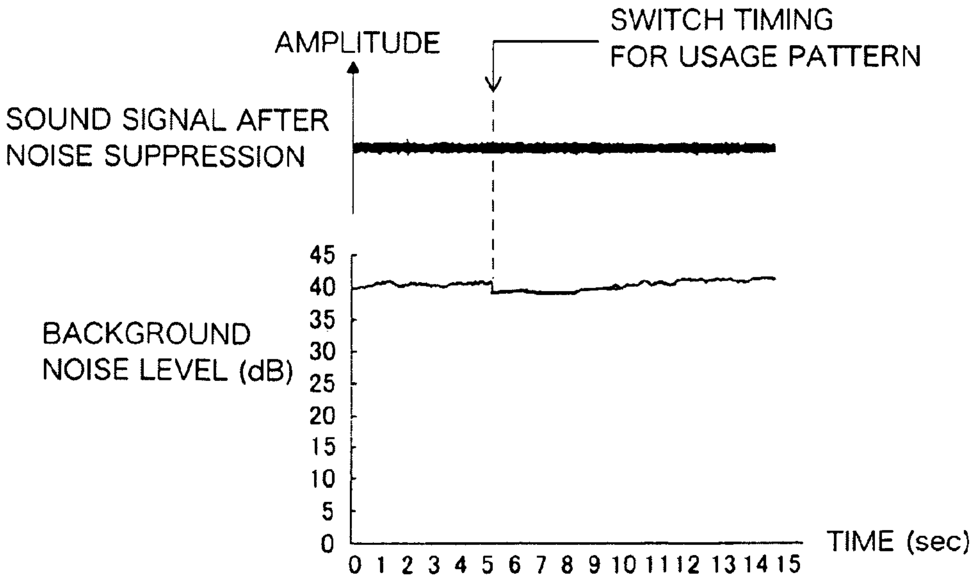

FIGS. 7A and 7B are explanatory diagrams for describing effects obtained by the mobile phone 1 according to Embodiment 1. In FIGS. 7A and 7B, a background noise level is depicted as an example of using environment information. FIG. 7A depicts an amplitude and a background noise level of a sound signal obtained after noise suppression is performed by a noise suppressing device including a configuration in which estimation of using environment information is restarted each time the microphone array process starts an operation. FIG. 7B depicts an amplitude and a background noise level of a sound signal after noise suppression is performed by the noise suppressing process performed by the mobile phone 1 according to Embodiment 1.

In a configuration in which, when usage patterns of the mobile phone 1 are switched, using environment information in the usage pattern before the usage patterns are changed is not used in the noise suppressing process in the usage pattern after the usage patterns are changed, the using environment information in the usage pattern after the usage patterns are changed is estimated from a given initial value. Therefore, as depicted in FIG. 7A, the background noise level returns to an initial value at a timing at which the usage patterns are switched, and about four seconds are required until an appropriate background noise level may be estimated. Since, in this period, sufficient noise suppression is not performed, an unnatural sound the noise of which is not sufficiently suppressed is transmitted to the intended party.

On the other hand, when the usage patterns of the mobile phone 1 are switched as described in Embodiment 1, in a configuration in which the using environment information in the usage pattern before the usage patterns are changed is used in the noise suppressing process in the usage pattern after the usage patterns are changed, as depicted in FIG. 7B, an appropriate background noise level may be estimated immediately after the usage patterns are switched. Therefore, since sufficient noise suppression is performed immediately after the usage patterns are switched, even though the usage patterns of the mobile phone 1 are switched during a telephone call, an unnatural sound is not transmitted to the intended party.

Figure 8:
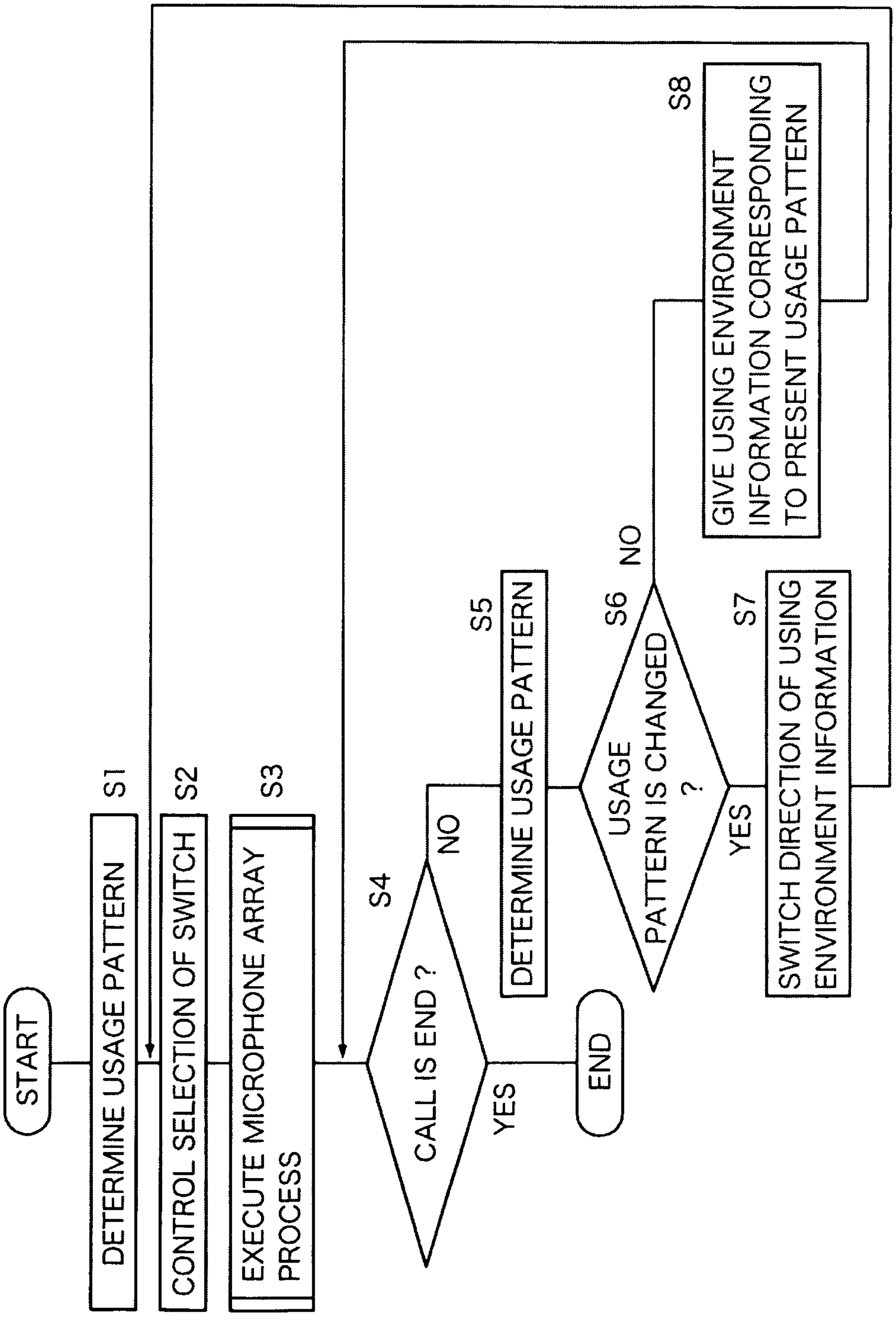
FIG. 8 is an operation chart depicting an example of a procedure of a noise suppressing process.

A noise suppressing process by the mobile phone 1 according to Embodiment 1 will be described below with reference to an operation chart. FIG. 8 is an operation depicting a procedure of the noise suppressing process. The following process is executed by the computation unit 2 according to the program stored in the ROM 3 of the mobile phone 1.

When communication (speech communication) with another mobile phone is started, the computation unit 2 (housing state determining unit 21) of the mobile phone 1 determines a usage pattern (normal style or viewer style) of the mobile phone 1 based on a detection result from the sensor 5 (at S1). The computation unit 2 (microphone array process control unit 24) controls selection of the switches 22, 23, and 28 depending on the determined usage pattern (at S2), and the sound signals from the sound input units 6 and 7 are transmitted to the first microphone array processing unit 26 or the second microphone array processing unit 27.

The computation unit 2 (first microphone array processing unit 26 or second microphone array processing unit 27) executes a microphone array process to the sound signals acquired from the sound input units 6 and 7 (at S3), and the sound signals the noise of which is suppressed is transmitted to a mobile phone of a communicatee through the communication unit 9. The details of the microphone array process will be described below with reference to FIG. 9.

The computation unit 2 determines whether speech communication with another mobile phone has ended (at S4). When it is determined that the speech communication has not ended (at S4: NO), the usage pattern of the mobile phone 1 is determined based on the detection result from the sensor 5 (at S5). The computation unit 2 (microphone array process control unit 24) determines, based on the usage pattern determined in operation S5, whether the usage pattern is changed (at S6). When it is determined that the usage pattern is not changed (at S6: NO), the computation unit 2 gives using environment information estimated in the microphone array processing unit corresponding to the present usage pattern to the microphone array processing unit which does not correspond to the present usage pattern (at S8). The computation unit 2 returns the process to operation S4 to repeat the processes in operations S4 to S6.

When it is determined that the usage pattern is changed (at S6: YES), the computation unit 2 (information converting unit 25) obtains the using environment information from the microphone array processing unit 26 (or 27) corresponding to the usage pattern before the usage patterns are changed, and switches exchange directions of the using environment information to give the using environment information to the microphone array processing unit 27 (or 26) corresponding to the usage pattern after the usage patterns are changed (at S7).

More specifically, when the normal style is changed into the viewer style, the computation unit 2 (information converting unit 25) reads the using environment information stored in the using environment information storing unit 262 of the first microphone array processing unit 26 to give the using environment information to the second microphone array processing unit 27. On the other hand, when the viewer style is changed into the normal style, the computation unit 2 (information converting unit 25) reads the using environment information stored in the using environment information storing unit 272 of the second microphone array processing unit 27 to give the using environment information to the first microphone array processing unit 26. The using environment estimating units 261 and 271 of the microphone array processing units 26 and 27 which acquire the using environment information from the information converting unit 25 store the acquired using environment information in the using environment information storing units 262 and 272 and use stored using environment information respectively.

The computation unit 2 returns the process to operation S2, controls selection of the switches 22, 23, and 28 depending on the usage pattern determined in operation S5 (at S2), and transmits the sound signals from the sound input units 6 and 7 to the microphone array processing unit 26 or the microphone array processing unit 27. The computation unit 2 repeats the processes in operations S2 to S7. When it is determined that the speech communication with another mobile phone has ended (at S4: YES), the computation unit 2 ends the process.

Figure 9:
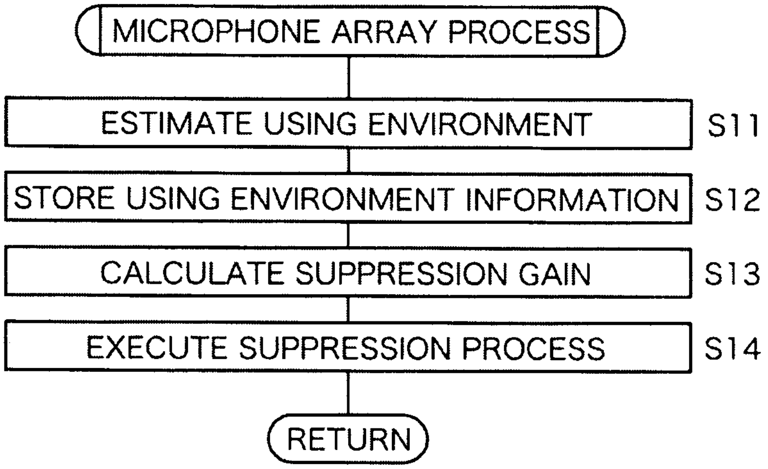
FIG. 9 is an operation chart depicting an example of a procedure of a microphone array process.

A microphone array process (operation S3 in FIG. 8) in the above noise suppressing process will be described below. FIG. 9 is an operation chart depicting a procedure of the microphone array process. The following process is executed by the computation unit 2 according to the control program stored in the ROM 3 of the mobile phone 1.

The computation unit 2 (using environment estimating units 261 and 271) estimates a using environment depending on a usage pattern of the mobile phone 1 based on the sound signals inputted from the sound input units 6 and 7 (at S11) and stores using environment information representing the estimated using environment in the using environment information storing units 262 and 272 (at S12). The computation unit 2 (suppression gain calculating units 263 and 273) calculates suppression gains suppressed by the noise suppressing units 264 and 274 using the estimated using environment information (at S13). The computation unit 2 (noise suppressing units 264 and 274) executes a suppressing process based on the calculated suppression gains (at S14) and returns to the noise suppressing process.

In Embodiment 1, when the usage patterns of the mobile phone 1 are switched, the microphone array processing unit 26 (or 27) corresponding to the usage pattern after the usage patterns are changed uses the using environment information estimated by the microphone array processing unit 27 (or 26) corresponding to the usage pattern before the usage patterns are changed. Therefore, even though the operations of the microphone array processing units 26 and 27 are switched by changing the usage patterns, an optimum noise suppressing process may be performed based on the using environment information estimated up to this point. In this manner, the optimum noise suppressing process may be performed immediately after the usage patterns are changed, and deterioration in sound quality caused by changing the usage patterns may be prevented.

Embodiment 2

A mobile phone according to Embodiment 2 will be described below. Since the mobile phone according to Embodiment 2 may be realized by the similar configuration as that of the mobile phone 1 according to Embodiment 1, the like configurations are denoted with like reference numerals, and a description thereof will not be given.

The mobile phone 1 according to Embodiment 1 has the configuration in which microphone array process is performed on each of the normal style and the viewer style. On the contrary, the mobile phone according to Embodiment 2 is configured to perform a microphone array process in the normal style but perform a noise suppressing process based on a sound signal received by one microphone 6*a* in the viewer style.

Figure 10:
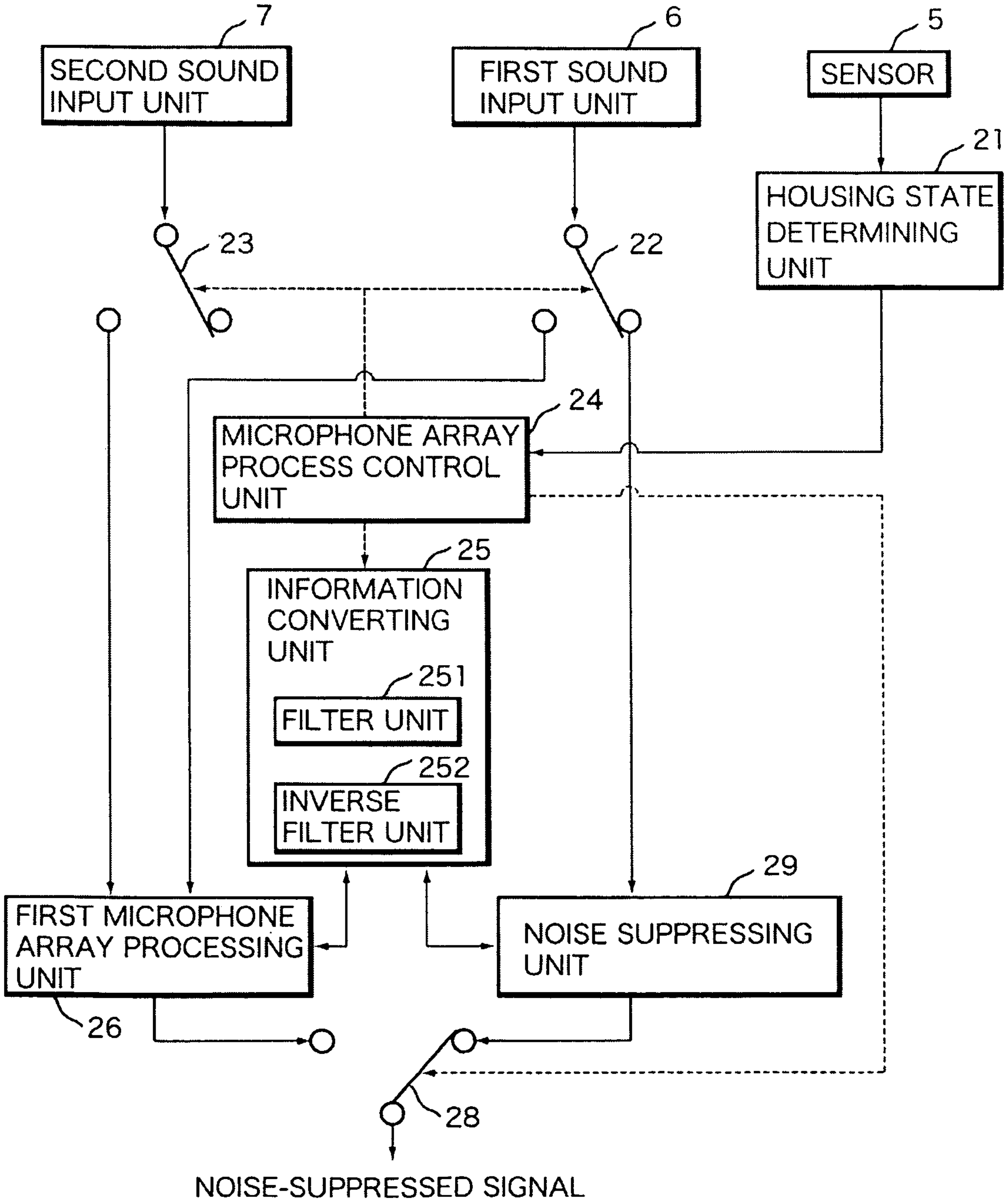
FIG. 10 is a functional block diagram depicting an example of a functional configuration of a mobile phone according to Embodiment 2.

FIG. 10 is a functional block diagram depicting a functional configuration of the mobile phone 1 according to Embodiment 2. In the mobile phone 1 according to Embodiment 2, the computation unit 2 has a function of a noise suppressing unit 29 in place of the second microphone array processing unit 27 depicted in FIG. 3. The information converting unit 25 according to Embodiment 2 has a filter unit 251 and an inverse filter unit 252. The configuration other than the above is the same as the configuration of Embodiment 1.

Although not depicted in the figure, the noise suppressing unit 29, similar to the first microphone array process unit 26, has functions of a using environment information estimating unit, a using environment information storing unit, a suppression gain calculating unit, and a noise suppressing unit.

The microphone array process control unit 24 according to Embodiment 2, similar to Embodiment 1, controls selection of the switches 22 and 23 to transmit sound signals from the sound input units 6 and 7 to the first microphone array processing unit 26 when the housing state determining unit 21 notifies the microphone array process control unit 24 of a determination result indicating that the mobile phone 1 is set in the normal style.

On the other hand, when the housing state determining unit 21 notifies the microphone array process control unit 24 of a determination result indicating that the mobile phone 1 is set in the viewer style, the microphone array process control unit 24 controls selection of the switches 22 and 23 to transmit only a sound signal from the sound input unit 6 to the noise suppressing unit 29. At this time, the microphone array process control unit 24 controls selection of the switch 28 to transmit the sound signal from the noise suppressing unit 29 to a given destination.

In this case, in Embodiment 2, although the first microphone array processing unit 26 performs a microphone array process, the noise suppressing unit 29 performs a noise suppressing process using a single microphone. Therefore, it is difficult that the using environment information estimated by the first microphone array processing unit 26 is simply replaced with the using environment information estimated by the noise suppressing unit 29.

Therefore, when the using environment information used in the first microphone array processing unit 26 is given to the noise suppressing unit 29 and when the using environment information used in the noise suppressing unit 29 is given to the first microphone array processing unit 26, the information converting unit 25 according to Embodiment 2 converts the pieces of using environment information into using environment information for the noise suppressing unit 29 or the first microphone array processing unit 26.

For example, when the noise suppressing unit 29 uses a background noise spectrum as the using environment information, the noise suppressing unit 29 performs a process to apply a high-pass filter to suppress a low-frequency component to the background noise spectrum. Therefore, the background noise spectrum stored in the using environment information storing unit of the noise suppressing unit 29 is a background noise spectrum to which the high-pass filter is applied. On the other hand, when the first microphone array processing unit 26 uses the background noise spectrum as the using environment information, the first microphone array processing unit 26 does not perform the process to apply the high-pass filter to suppress a low-frequency component to the background noise spectrum. Therefore, the background noise spectrum stored in the using environment information storing unit 262 of the first microphone array processing unit 26 is a background noise spectrum to which the high-pass filter is not applied yet.

The information converting unit 25 has the filter unit 251 which performs a process of applying a filter including the same characteristic as that of the high-pass filter used when the noise suppressing unit 29 performs the noise suppressing process by using the background noise spectrum and the inverse filter unit 252 which performs a process of applying a filter including an inverse characteristic of the filter applied by the filter unit 251. The information converting unit 25 performs the filtering process by the filter unit 251 when the background noise spectrum stored in the using environment information storing unit 262 of the first microphone array processing unit 26 is given to the noise suppressing unit 29. The information converting unit 25 performs a filtering process by the inverse filter unit 252 when the background noise spectrum stored in the using environment information storing unit of the noise suppressing unit 29 is given to the first microphone array processing unit 26 to eliminate an influence of the high-pass filter.

With the above configuration, in Embodiment 2, even in a configuration in which the microphone array process and the noise suppressing process are switched depending on the usage patterns of the mobile phone 1, the using environment information used in the microphone array process and the using environment information used in the noise suppressing process may be commonly used. Therefore, even though the operations of the microphone array processing unit 26 and the noise suppressing unit 29 are switched by changing the usage patterns of the mobile phone 1, an optimum noise suppressing process based on the using environment information estimated up to the point may be performed. In this manner, the optimum noise suppressing process may be performed immediately after the usage patterns are changed, and deterioration in sound quality caused by changing the usage patterns may be prevented.

Since the similar process as described in Embodiment 1 is performed as the noise suppressing process performed by the mobile phone 1 according to Embodiment 2, a description thereof will not be given. In the process in operation S7 in the operation chart depicted in FIG. 8, the computation unit 2 according to Embodiment 2 (information converting unit 25) performs a given conversion process when the using environment information is given to the first microphone array processing unit 26 or the noise suppressing unit 29.

Embodiment 3

A mobile phone according to Embodiment 3 will be described below. Since the mobile phone according to Embodiment 3 may be realized by the similar configuration as that of the mobile phone 1 according to Embodiment 1, like reference numerals denote like configurations, and a description thereof will not be given.

The mobile phone 1 according to Embodiment 1 has the configuration in which selection of the switches 22 and 23 depicted in FIG. 3 is controlled to operate the first microphone array processing unit 26 in use in the normal style and to operate the second microphone array processing unit 27 in use in the viewer style. In contrast to the above, the mobile phone according to Embodiment 3 has a configuration in which both of the first microphone array processing unit 26 and the second microphone array processing unit 27 are operated regardless of the usage patterns, i.e., the normal style and the viewer style, of the mobile phone 1.

Figure 11:
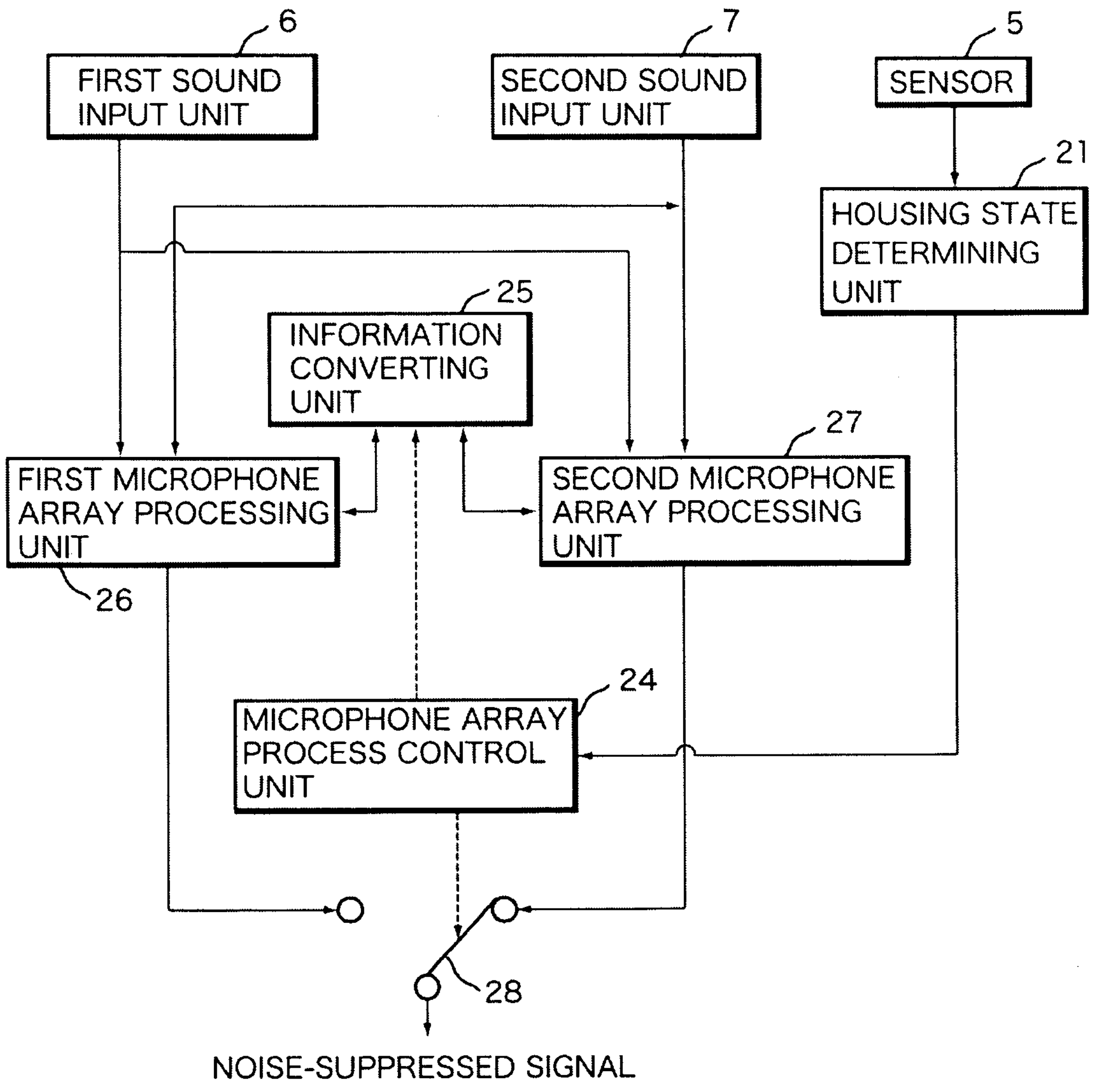
FIG. 11 is a functional block diagram depicting an example of a functional configuration of a mobile phone according to Embodiment 3.

FIG. 11 is a functional block diagram depicting a functional configuration of the mobile phone 1 according to Embodiment 3. In the mobile phone 1 according to Embodiment 3, the computation unit 2 does not include the functions of the switches 22 and 23 depicted in FIG. 3. Therefore, sound signals acquired by the first sound input unit 6 and the second sound input unit 7 are transmitted to the first microphone array processing unit 26 and the second microphone array processing unit 27, respectively. Therefore, the first microphone array processing unit 26 and the second microphone array processing unit 27 always execute the microphone array process regardless of the usage patterns of the mobile phone 1. With respect to the microphone array processing unit 26 (or 27) corresponding to an embodiment which is not an actual usage pattern, only the using environment estimating unit 261 (or 271) is operated.

When the housing state determining unit 21 notifies the microphone array process control unit 24 according to Embodiment 3 that the mobile phone 1 is set in the normal style, the microphone array process control unit 24 controls selection of the switch 28 to transmit a sound signal from the first microphone array processing unit 26 to a given destination. When the housing state determining unit 21 notifies the microphone array process control unit 24 that the mobile phone 1 is set in the viewer style, the microphone array process control unit 24 controls selection of the switch 28 to transmit a sound signal from the second microphone array processing unit 27 to a given destination. In this manner, the sound signal from the microphone array processing unit 26 depending on the usage pattern of the mobile phone 1 is transmitted to the given destination.

In this manner, when the using environment estimating units 261 and 271 of the microphone array processing units 26 and 27 are always operated regardless of the usage patterns of the mobile phone 1, even immediately after the usage patterns are changed, using environment information in the microphone array processing unit 26 (or 27) after the usage patterns are changed is estimated in advance. For this reason, a microphone array process based on optimum using environment information may be performed. Therefore, since deterioration in performance of the microphone array process caused by switching the usage patterns of the mobile phone 1 is prevented, good sound quality may be maintained.

On the other hand, for example, a determining process for a speech section and a noise section requires a difficult technique. A result obtained by estimation performed by the process by the microphone array processing unit 26 (or 27) corresponding to the usage pattern of the actual mobile phone 1 has relatively higher an example of reliability. Therefore, as in Embodiment 3, even in the configuration in which all the microphone array processing units 26 and 27 are operated regardless of the usage patterns of the mobile phone 1, only such using environment information of speech section and noise section may be shared by the microphone array processing units 26 and 27.

Therefore, when the usage patterns of the mobile phone 1 are changed, the information converting unit 25 according to Embodiment 3 reads given using environment information from the using environment information storing unit 262 (or 272) of the microphone array processing unit 26 (or 27) corresponding to the usage pattern before the usage patterns are changed. The information converting unit 25 gives the read using environment information to the microphone array processing unit 27 (or 26) corresponding to the usage pattern after the usage patterns are changed.

With the above configuration, the information converting unit 25 always gives a determination result for the speech section and the noise section stored in the using environment information storing unit 262 (or 272) of the microphone array processing unit 26 (or 27) corresponding to the present usage pattern to the microphone array processing unit 27 (or 26). The microphone array processing unit 27 (or 26) corresponding to the usage pattern which is not the present usage pattern estimates and updates, for example, a background noise spectrum by using the determination result for the speech section and the noise section acquired from the information converting unit 25.

In this manner, when using environment information estimated by the other microphone array processing unit 27 (or 26) is more optimum, the microphone array processing unit 26 (or 27) may perform a microphone array process using the more optimum using environment information. Therefore, even though the operations of the microphone array processing units 26 and 27 are switched by changing the usage patterns of the mobile phone 1, the microphone array processing units 26 and 27 may perform the optimum noise suppressing processes based on the pieces of using environment information estimated up to the point by the microphone array processing units 26 and 27, respectively. In this manner, the optimum noise suppressing process may be performed immediately after the usage patterns are changed, and deterioration in sound quality caused by changing the usage patterns may be prevented.

Figure 12:
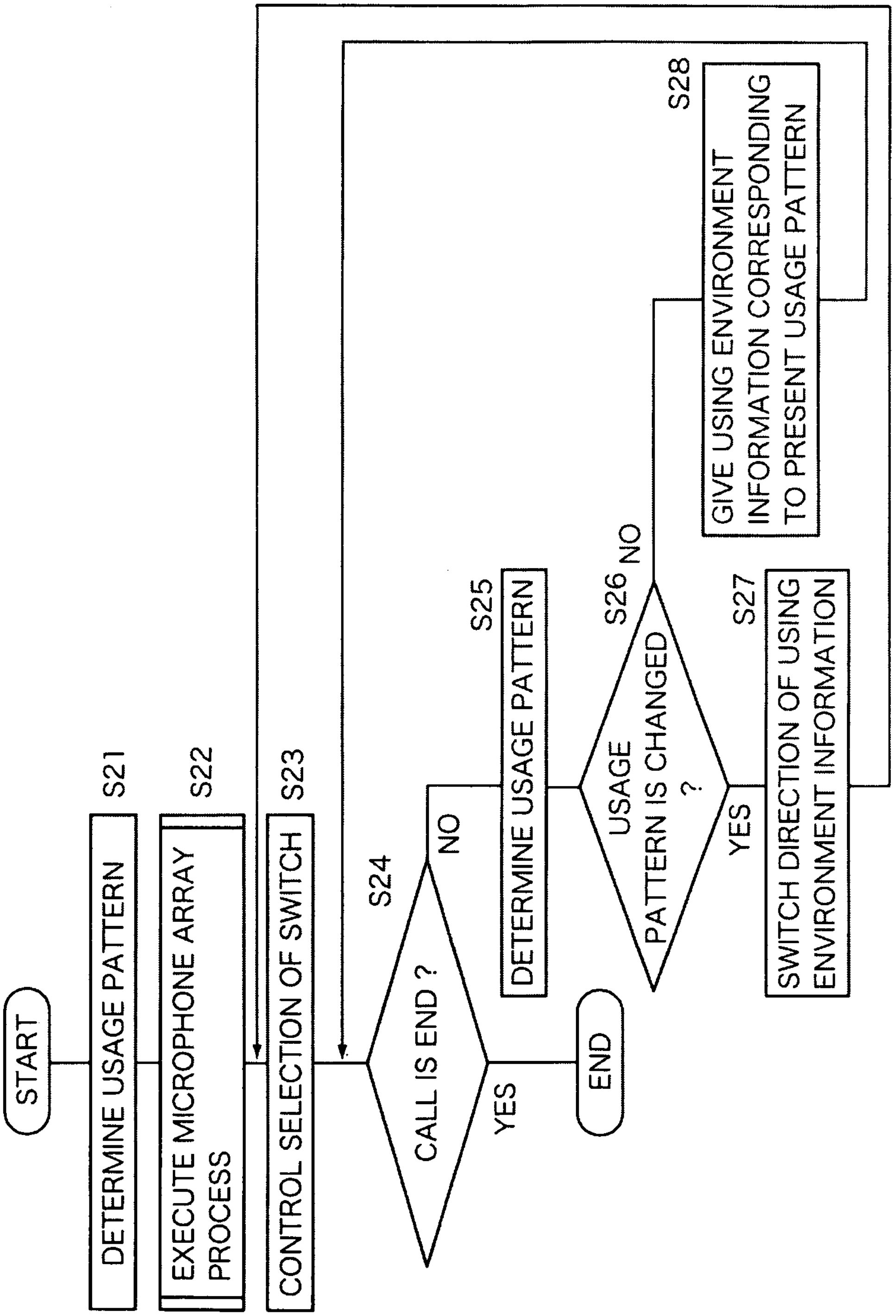
FIG. 12 is an operation chart depicting an example of a procedure of the noise suppressing process.

A noise suppressing process performed by the mobile phone 1 according to Embodiment 3 will be described below with reference to an operation chart. FIG. 12 is an operation chart depicting a procedure of the noise suppressing process. The following process is executed by the computation unit 2 according to the control program stored in the ROM 3 of the mobile phone 1.

When communication (speech communication) with, for example, another mobile phone is started, the computation unit 2 (housing state determining unit 21) of the mobile phone 1 determines a usage pattern (normal style or viewer style) of the mobile phone 1 based on a detection result from the sensor 5 (at S21). The computation unit 2 (first microphone array processing unit 26 and second microphone array processing unit 27) executes two types of microphone array processes to the sound signals acquired from the sound input units 6 and 7 (at S22). The details of the microphone array process are the same as those described in Embodiment 1 with reference to FIG. 9. With respect to the microphone array processing unit 26 (or 27) corresponding to a usage pattern which is not the usage pattern determined in operation S21, only the using environment estimating unit 261 (or 271) is operated.

The computation unit 2 (microphone array process control unit 24) controls selection of the switch 28 depending on the usage pattern determined in operation S21 (at S23), and a sound signal the noise of which is suppressed by the first microphone array processing unit 26 or the second microphone array processing unit 27 is transmitted to a mobile telephone of a communicatee through the communication unit 9.

The computation unit 2 determines whether speech communication with another mobile phone has ended (at S24). When it is determined that the speech communication has not ended (at S24: NO), a usage pattern of the mobile phone 1 is determined based on a detection result from the sensor 5 (at S25). The computation unit 2 (microphone array process control unit 24) determines whether the usage patterns are changed based on the usage pattern determined in operation S25 (at S26). When it is determined that the usage patterns are not changed (at S26: NO), using environment information estimated in the microphone array processing unit corresponding to the present usage pattern is given to the microphone array processing unit which does not correspond to the present usage pattern (at S28). The computation unit 2 returns the process to operation S24 to repeat the processes in operations S24 to S26.

When it is determined that the usage patterns are changed (at S26: YES), the computation unit 2 (information converting unit 25) acquires given using environment information from the microphone array processing unit 26 (or 27) corresponding to the usage pattern before the usage patterns are changed to switch exchange directions of the using environment information to give the using environment information to the microphone array processing unit 27 (or 26) corresponding to the usage pattern after the usage patterns are changed (at S27). More specifically, the using environment information such as the determination result for the speech section and the noise section estimated by the microphone array processing unit 26 (or 27) of an actual usage pattern is given as optimum using environment information.

The computation unit 2 returns the process to operation S23 to control selection of the switch 28 depending on the usage pattern determined in operation S25 (at S23). The computation unit 2 repeats the processes in operations S23 to S27. When it is determined that the speech communication with the other mobile phone has ended (at S24: YES), the computation unit 2 ends the process.

Although Embodiment 3 is described as a modification of Embodiment 1, Embodiment 3 may also be applied to the configuration of Embodiment 2.

Embodiment 4

A mobile phone according to Embodiment 4 will be described below. Since the mobile phone according to Embodiment 4 may be realized by the similar configuration as that of the mobile phone 1 according to Embodiment 3, like reference numerals denote like configurations, and a description thereof will not be given.

The mobile phone 1 according to Embodiment 3 has the configuration in which using environment information is estimated by both the using environment estimating units 261 and 271 of the microphone array processing units 26 and 27 regardless of the usage patterns. The mobile phone according to Embodiment 4 performs not only estimation of the using environment information but also the noise suppressing process by the noise suppressing units 264 and 274 to compare amounts of suppression of noise suppressed by the microphone array processes performed by the noise suppressing units 264 and 274 with each other and to notify a user (speaker) of a comparison result.

Figure 13:
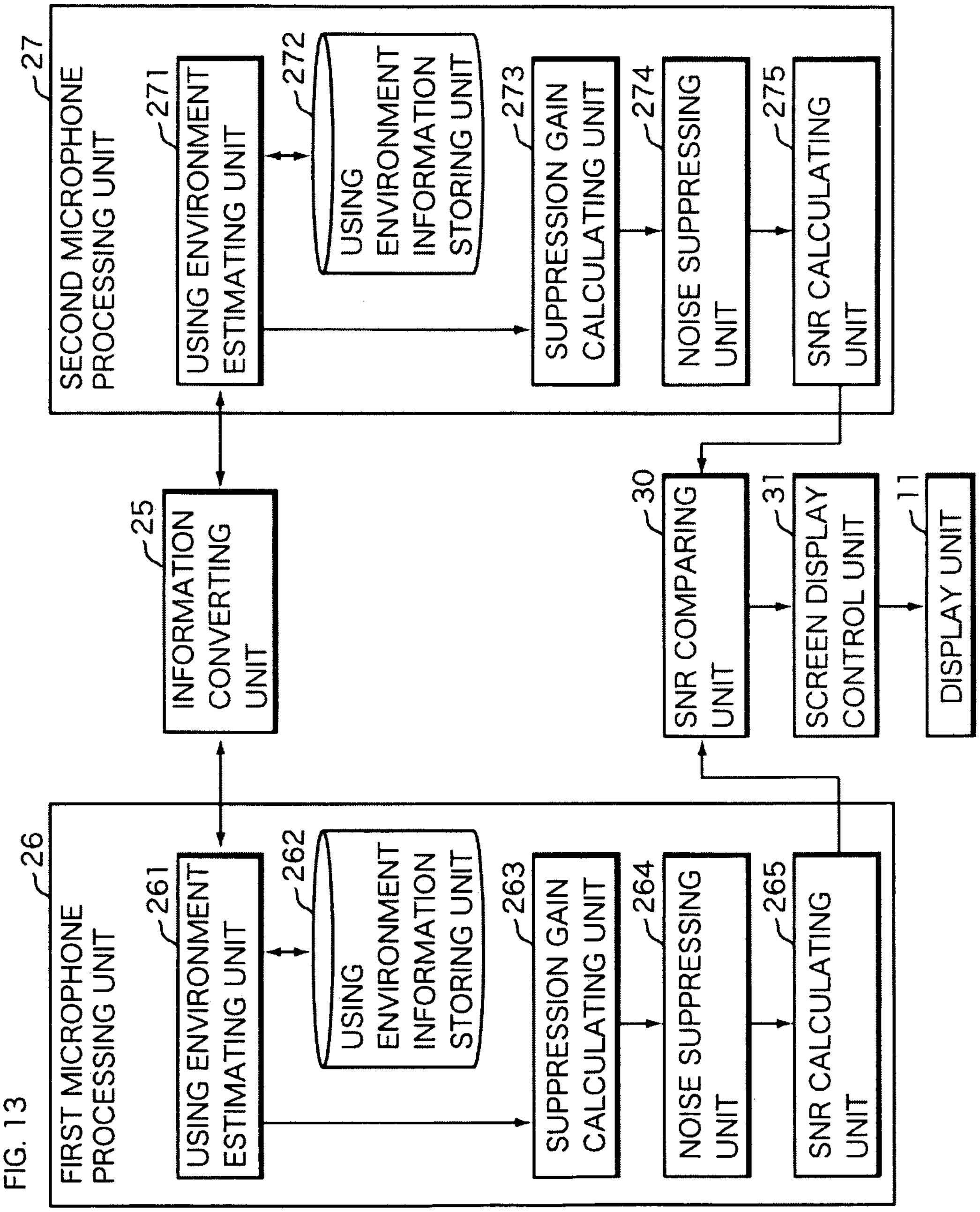
FIG. 13 is a functional block diagram depicting a functional configuration of a mobile phone according to Embodiment 4.

FIG. 13 is a functional block diagram depicting a functional configuration of the mobile phone 1 according to Embodiment 4. In the mobile phone 1 according to Embodiment 4, the computation unit 2 not only has the configuration depicted in FIG. 11 but also the functions of an SNR comparing unit 30 and a screen display control unit 31. The microphone array processing units 26 and 27 according to Embodiment 4 not only have the configuration depicted in FIG. 4 but also SNR calculating units 265 and 275.

The SNR calculating units 265 and 275 of the microphone array processing units 26 and 27 according to Embodiment 4 calculate SNRs based on Equation 1 using the noise suppressing processes by the noise suppressing units 264 and 274. The SNR is a ratio of a level of a speech signal uttered by user to a level of a noise component. A higher SNR means higher sound quality. The SNR calculating units 265 and 275 transmit the calculated SNR to the SNR comparing unit 30.

The SNR comparing unit 30 compares the SNRs acquired from the SNR calculating units 265 and 275 to determine whether the SNR in the microphone array processing unit 26 (or 27) corresponding to the present usage pattern determined by the housing state determining unit 21 is smaller than the SNR in the other microphone array processing unit 27 (or 26). When the SNR in the microphone array processing unit 26 (or 27) corresponding to the present usage pattern is smaller than the SNR in the other microphone array processing unit 27 (or 26), the SNR comparing unit 30 notifies the screen display control unit 31 as such.

Figure 14:
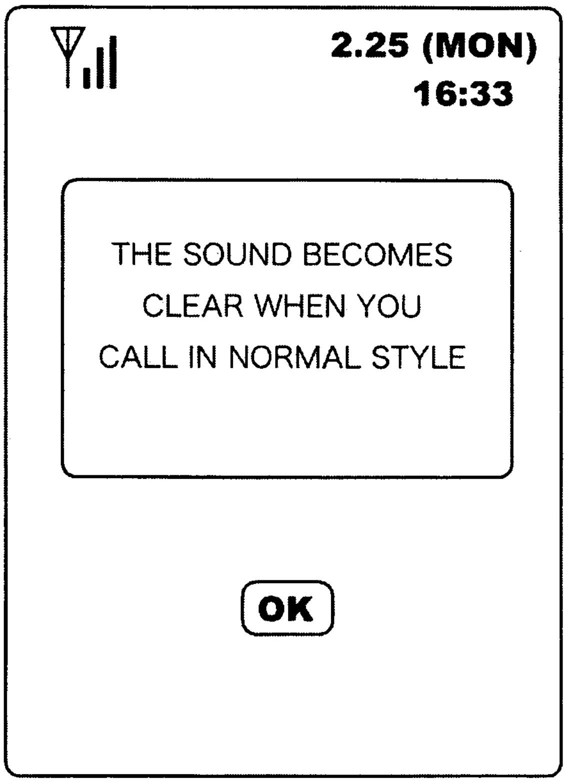
FIG. 14 is a schematic diagram depicting an example of a configuration example of a display screen.

Based on the screen information stored in advance in the ROM 3, the screen display control unit 31 generates screen information which displays that a higher SNR is obtained in the usage pattern which is not the present usage pattern to cause the display unit 11 to display the screen information. FIG. 14 is a schematic diagram depicting a configuration of the display screen. The display screen depicted in FIG. 14 is a screen to notify a user who is using the mobile phone 1 in the viewer style that speech communication may be performed with higher quality in the normal style than in the viewer style.

In this manner, when the user is notified that speech communication may be performed with higher quality in the usage pattern which is not the present usage pattern, the user may know a usage pattern suitable for the noise suppressing process. When the user switches the notified usage pattern, speech communication based on a sound signal the noise of which is optimally suppressed may be performed. The mobile phone 1 according to Embodiment 4 is configured to notify that use in the other usage pattern is preferable by a notification screen as depicted in FIG. 14. However, for example, notification by audio guidance may also be performed. In addition to the configuration using the SNRs, a configuration in which amounts of suppression of noise suppressed by the microphone array processing units 26 and 27 are compared with each other may be used.

Figure 15:
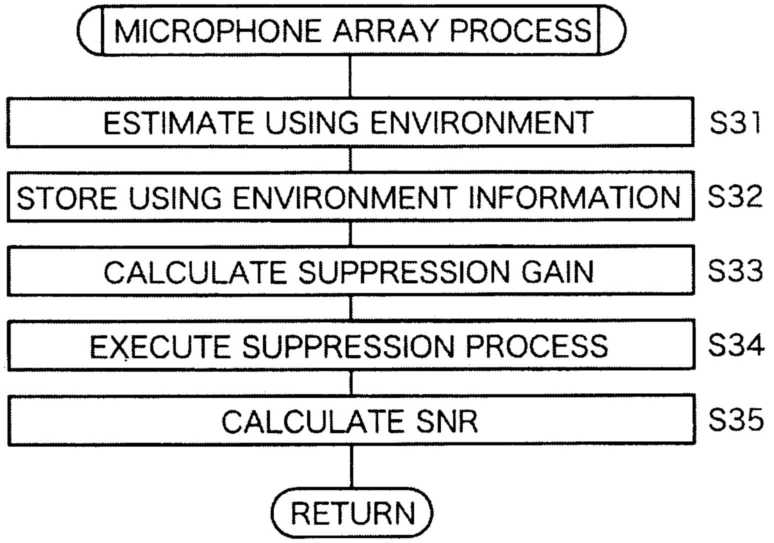
FIG. 15 is an operation chart depicting an example of a procedure of a microphone array process.

Microphone array processes performed by the microphone array processing units 26 and 27 in Embodiment 4 will be described below. FIG. 15 is an operation chart depicting a procedure of the microphone array process. The following process is executed by the computation unit 2 according to the control program stored in the ROM 3 of the mobile phone 1.

The computation unit 2 (using environment estimating units 261 and 271) estimates a using environment depending on a usage pattern of the mobile phone 1 based on the sound signals inputted from the sound input units 6 and 7 (at S31) and stores using environment information representing the estimated using environment in the using environment information storing units 262 and 272 (at S32). The computation unit 2 (suppression gain calculating units 263 and 273) calculates suppression gains suppressed by the noise suppressing units 264 and 274 by using the estimated using environment information (at S33). The computation unit 2 (noise suppressing units 264 and 274) executes a suppressing process based on the calculated suppression gains (at S34). The computation unit 2 (SNR calculating units 265 and 275) calculates SNRs using Equation 1 by the noise suppressing units 264 and 274 (at S35) to return to the noise suppressing process.

Figure 16:
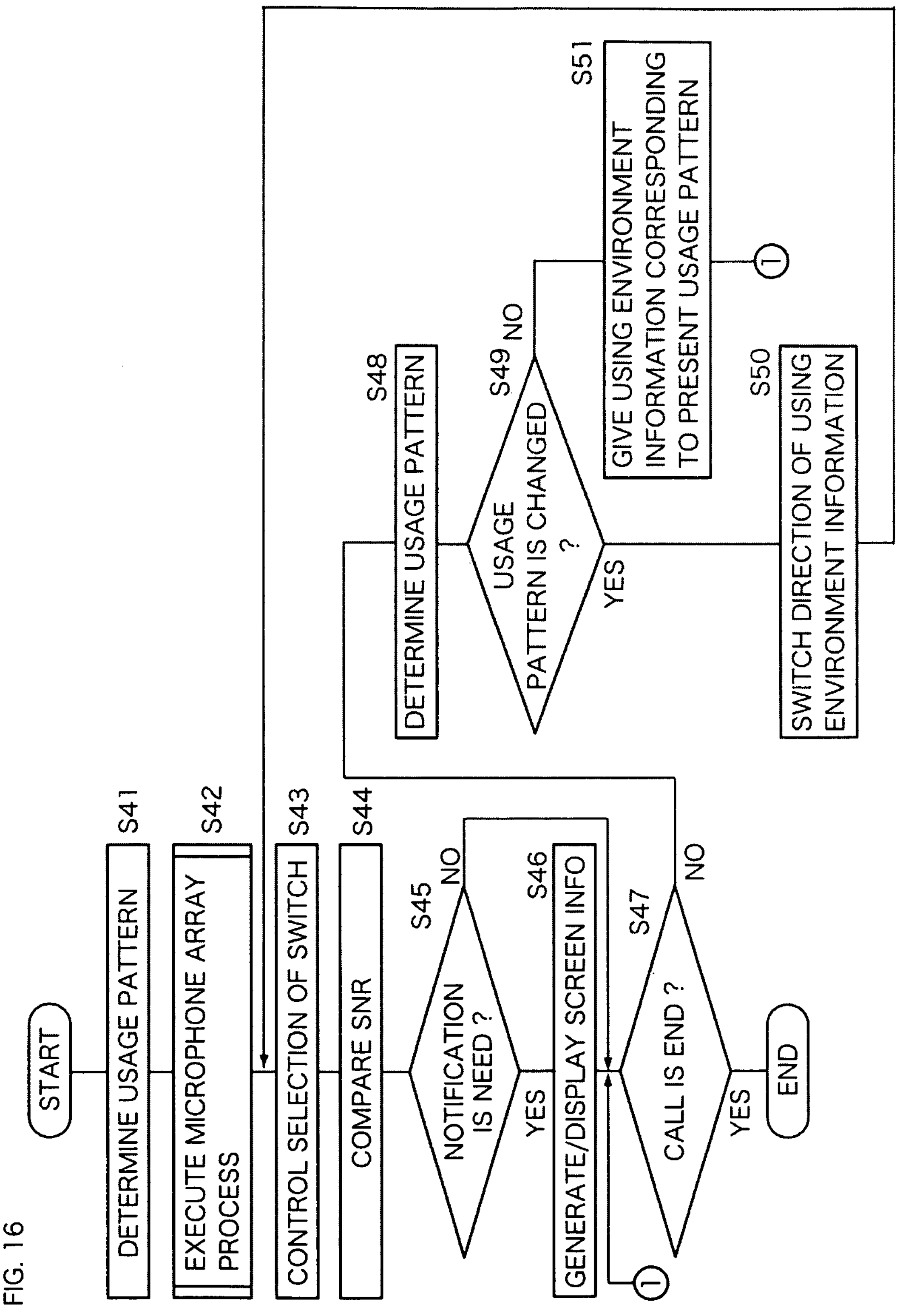
FIG. 16 is an operation chart depicting an example of a procedure of a noise suppressing process.

A noise suppressing process by the mobile phone 1 according to Embodiment 4 including the microphone array processing units 26 and 27 that perform the microphone array processes will be described below with reference to an operation chart. FIG. 16 is an operation chart depicting a procedure of the noise suppressing process. The following process is executed by the computation unit 2 according to the control program stored in the ROM 3 of the mobile phone 1.

When communication (speech communication) with, for example, another mobile phone is started, the computation unit 2 (housing state determining unit 21) of the mobile phone 1 determines a usage pattern (normal style or viewer style) of the mobile phone 1 based on a detection result from the sensor 5 (at S41). The computation unit 2 (first microphone array processing unit 26 and second microphone array processing unit 27) executes the microphone array processes, which are described with reference to FIG. 15, to the sound signals acquired from the sound input units 6 and 7 (at S42).

The computation unit 2 (microphone array process control unit 24) controls selection of the switch 28 depending on the usage pattern determined in operation S41 (at S43), and a sound signal the noise of which is suppressed by the first microphone array processing unit 26 or the second microphone array processing unit 27 is transmitted to a mobile phone of a communicatee through the communication unit 9.

The computation unit 2 (SNR comparing unit 30) compares SNRs calculated by the SNR calculating units 265 and 275 of the microphone array processing units 26 and 27 (at S44). The computation unit 2 determines whether notification to a user is necessary based on a determination of whether the SNR in the microphone array processing unit 26 (or 27) corresponding to the present usage pattern is smaller than the SNR in the other microphone array processing unit 27 (or 26) (at S45). When the SNR in the microphone array processing unit 26 (or 27) corresponding to the present usage pattern is smaller than the SNR in the other microphone array processing unit 27 (or 26), the computation unit 2 determines that notification to the user is necessary.

When it is determined that the notification to the user is necessary (at S45: YES), the computation unit 2 generates screen information to display the screen as depicted in FIG. 14 and causes the display unit 11 to display the screen information (at S46). When it is determined that the notification to the user is not necessary (at S45: NO), the computation unit 2 skips the process in operation S46 to determine whether the speech communication with the other mobile phone has ended (at S47).

When it is determined that the speech communication has not ended (at S47: NO), the computation unit 2 determines a usage pattern of the mobile phone 1 based on the detection result from the sensor 5 (at S48). The computation unit 2 (microphone array process control unit 24) determines whether the usage patterns are changed based on the usage pattern determined in operation S48 (at S49). When it is determined that the usage patterns are not changed (at S49: NO), the computation unit 2 gives using environment information estimated in the microphone array processing unit corresponding to the present usage pattern to the microphone array processing unit which does not correspond to the present usage pattern (at S51). The computation unit 2 returns the process to operation S47 to repeat the processes in operations S47 to S49.

When it is determined that the usage patterns are changed (S49: YES), the computation unit 2 (information converting unit 25) acquires given using environment information from the microphone array processing unit 26 (or 27) corresponding to the usage pattern before the usage patterns are changed and switches exchange directions of the using environment information to give the using environment information to the microphone array processing unit 27 (or 26) corresponding to the usage pattern after the usage patterns are changed (at S50).

The computation unit 2 returns the process to operation S43 to control selection of the switch 28 depending on the usage pattern determined in operation S48 (S43). The computation unit 2 repeats the processes in operations S43 to S51. When it is determined that the speech communication with the other mobile phone has ended (S47: YES), the process ends.

Embodiment 5

A mobile phone according to Embodiment 5 will be described below. The mobile phone according to Embodiment 5 may be realized by the similar configuration as that of the mobile phone 1 according to Embodiment 1, like reference numerals denote like configurations, and a description thereof will not be given.

The mobile phone 1 according to Embodiments 1 to 4 is configured to have two microphones 6*a* and 7*a*. The mobile phone 1 according to Embodiment 5 is configured to have three microphones. Note that the number of microphones is not limited to two or three.

Figure 17A:
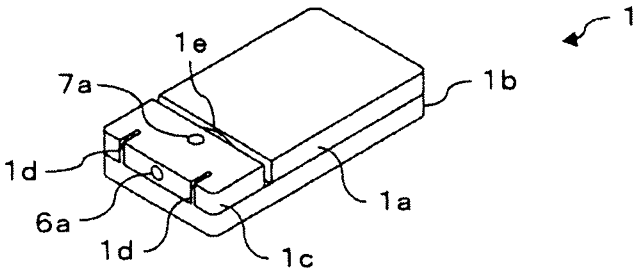
FIGS. 17A and 17B are schematic diagrams each depicting an example of a configuration of a mobile phone according to Embodiment 5.
Figure 17B:
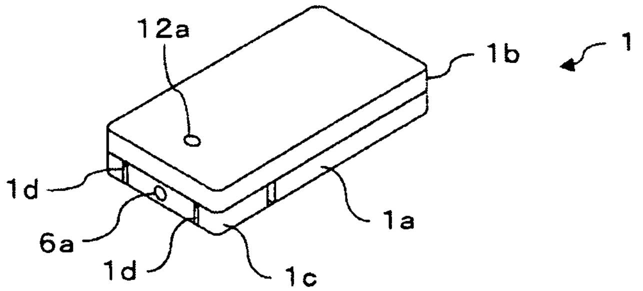

FIGS. 17A and 17B are schematic diagrams each depicting a configuration of a mobile phone according to Embodiment 5. FIGS. 17A and 17B depict only a folded state of the mobile phone 1. FIG. 17A is an external perspective view of the mobile phone 1 in which the housing 1*a* with the display unit 11 faces upward, and FIG. 17B is an external perspective view of the mobile phone 1 in which the housing 1*b* with the operation unit 10 faces upward.

The mobile phone 1 according to Embodiment 5 has, in addition to the configuration elements included in the mobile phone 1 according to Embodiment 1 depicted in FIGS. 1A, 1B, and 1C, a microphone 12*a* at an appropriate position on a surface opposing a surface on which the operation unit 10 of the housing 1*b* is arranged.

Figure 18:
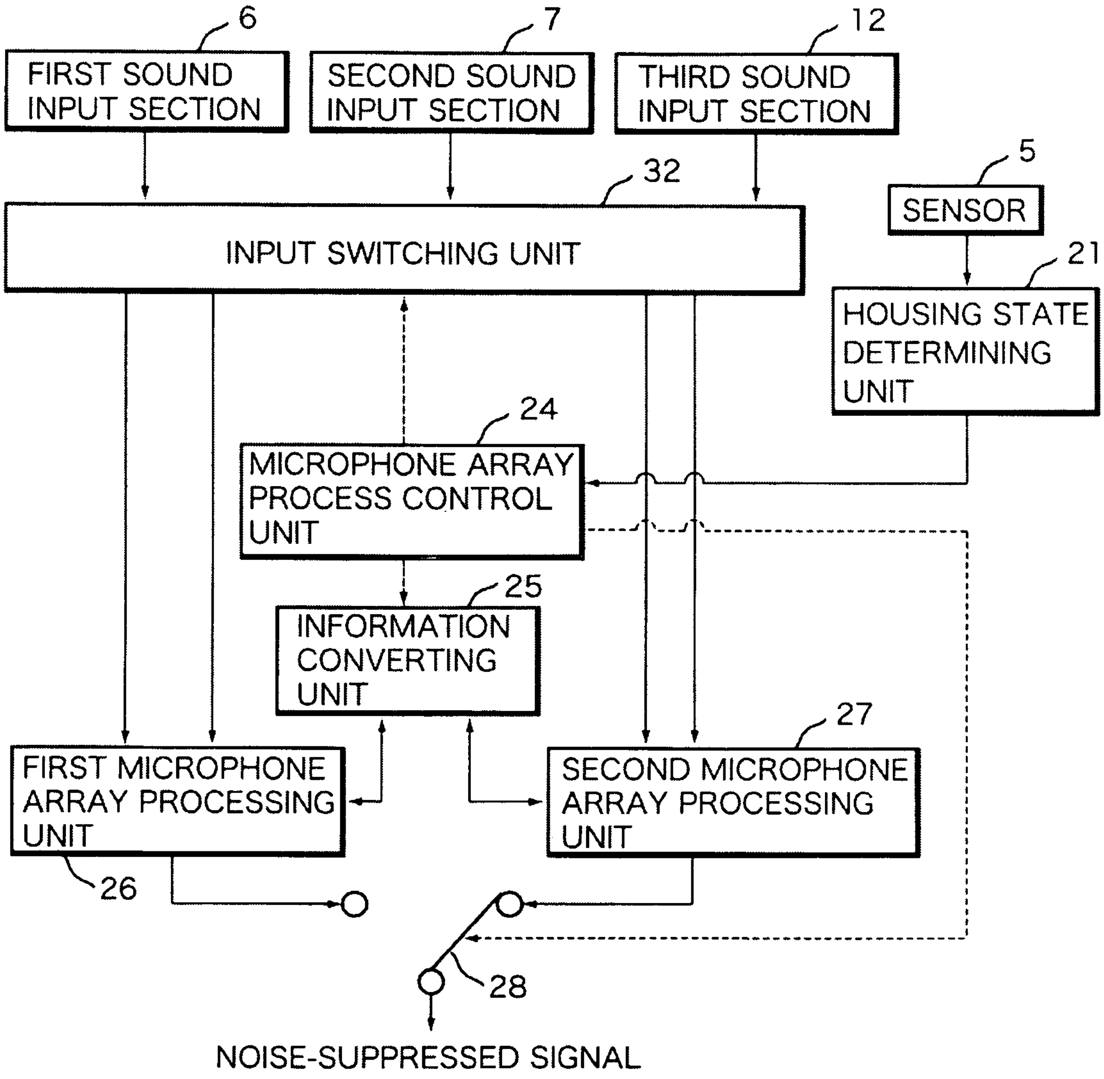
FIG. 18 is a functional block diagram depicting an example of a functional configuration of the mobile phone according to Embodiment 5.

Functions of the mobile phone 1 realized by causing the computation unit 2 to execute various control programs stored in the ROM 3 in the mobile phone 1 according to Embodiment 5 will be described below. FIG. 18 is a functional block diagram depicting a functional configuration of the mobile phone 1 according to Embodiment 5. The computation unit 2 of the mobile phone 1 according to Embodiment 5 may have an input switching unit 32 in place of the switches 22 and 23 in the configuration depicted in FIG. 3.

The mobile phone 1 according to Embodiment 5 has a third sound input unit 12 including the microphone 12*a*, an amplifier, and an A/D converter (both of them are not depicted). The first sound input unit 6, the second sound input unit 7, and the third sound input unit 12 transmit sound signals obtained by receiving sounds to the input switching unit 32.

The microphone array process control unit 24 according to Embodiment 5 controls selection by the input switching unit 32 depending on a usage pattern of the mobile phone notified by the housing state determining unit 21 to transmit the sound signals from two of the sound input units 6, 7, and 12 to the microphone array processing unit 26 (or 27).

More specifically, when the microphone array process control unit 24 is notified that the normal style is set, the microphone array process control unit 24 controls the input switching unit 32 to transmit the sound signals from the sound input units 6 and 7 to the first microphone array processing unit 26. When the microphone array process control unit 24 notifies that the viewer style is set, the microphone array process control unit 24 controls the input switching unit 32 to transmit the sound signals inputted from the sound input units 6 and 12 to the second microphone array processing unit 27.

Figure 19A:
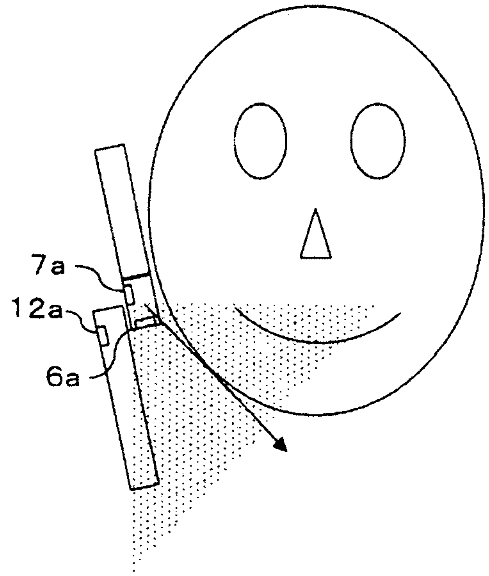
FIGS. 19A and 19B are schematic diagrams each depicting an example of a pattern of directivity in the mobile phone according to Embodiment 5.
Figure 19B:
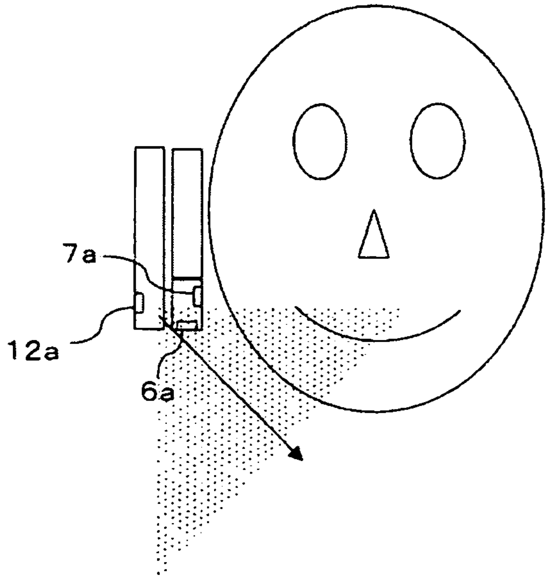

With this configuration, the mobile phone 1 according to Embodiment 5 may obtain directivity patterns as depicted in FIGS. 19A and 19B. FIGS. 19A and 19B are schematic diagrams each depicting a pattern of directivity in the mobile phone 1 according to Embodiment 5. In the mobile phone 1 according to Embodiment 5, in the normal style, as depicted in FIG. 19A, a sound including a cone-shaped directivity pattern including a line connecting the two microphones 7*a* and 6*a* to each other as a center line may be received, and noise suppression is performed such that a dead space of directivity is formed on a side surface side on which the microphone 7*a* is arranged. Furthermore, in the viewer style, as depicted in FIG. 19B, a sound including a cone-shaped directivity pattern including a line connecting the two microphones 12*a* and 6*a* to each other as a center line may be received, and noise suppression is performed such that a dead space of directivity is formed on a side surface side on which the microphone 12*a* is arranged.

In this manner, in the mobile phone 1 according to Embodiment 5, the two microphones used in a microphone array process are appropriate switched depending on the usage patterns to make it possible to always form a cone-shaped directivity pattern which does not form a directivity in a direction opposing a direction to a target sound source (mouth of a speaker). Therefore, in the mobile phone 1 according to Embodiment 5, since an optimum noise suppressing process may be performed regardless of usage patterns, preferable sound quality may be maintained.

Since the noise suppressing process performed by the mobile phone 1 according to Embodiment 5 is similar to the process described in Embodiment 1, a description thereof will not be given. In the process in operation S2 in the operation chart depicted in FIG. 8, the computation unit 2 (microphone array process control unit 24) according to Embodiment 5 selects two from the three sound input units 6, 7, and 12 and controls the input switching unit 32 to transmit the sound signals from the two selected sound input units to any one of the microphone array processing units 26 and 27.

Embodiment 6

A mobile phone according to Embodiment 6 will be described below. Since the mobile phone according to Embodiment 6 may be realized by the similar configuration as that of the mobile phone 1 according to Embodiment 5, like reference numerals denote like configurations, and a description thereof will not be given.

The mobile phone 1 according to Embodiment 5 may be configured such that two microphones selected from the three microphones 6*a*, 7*a*, and 12*a* are switched in use in the normal style and in use in the viewer style to perform a microphone array process. In the mobile phone 1 according to Embodiment 6, in addition to the uses in the normal style and the viewer style, in use in the normal style, a speech communication style (also called a normal style in Embodiment 6) in which a speaker uses the mobile phone 1 while bringing the loud speaker 8*a* close to his/her ear of a speaker and a style (hereinafter referred to as a television telephone style) in which a speaker uses the mobile phone 1 while watching the display screen of the display unit 11 may be switched.

Therefore, the mobile phone 1 according to Embodiment 6 has a configuration in which a microphone array process is performed such that three microphones 6*a*, 7*a*, and 12*a* are switched in use in the normal style, in use in the viewer style, and in use in the television telephone style. In the mobile telephone according to Embodiment 6, a style in which a speaker uses the mobile phone 1 while watching the display screen of the display unit 11 in the state of the viewer style is also available. However, in order to simplify the explanation, in Embodiment 6, the configuration in which the above-mentioned normal style, viewer style, and television telephone style may be switched will be described as an example.

Figure 20:
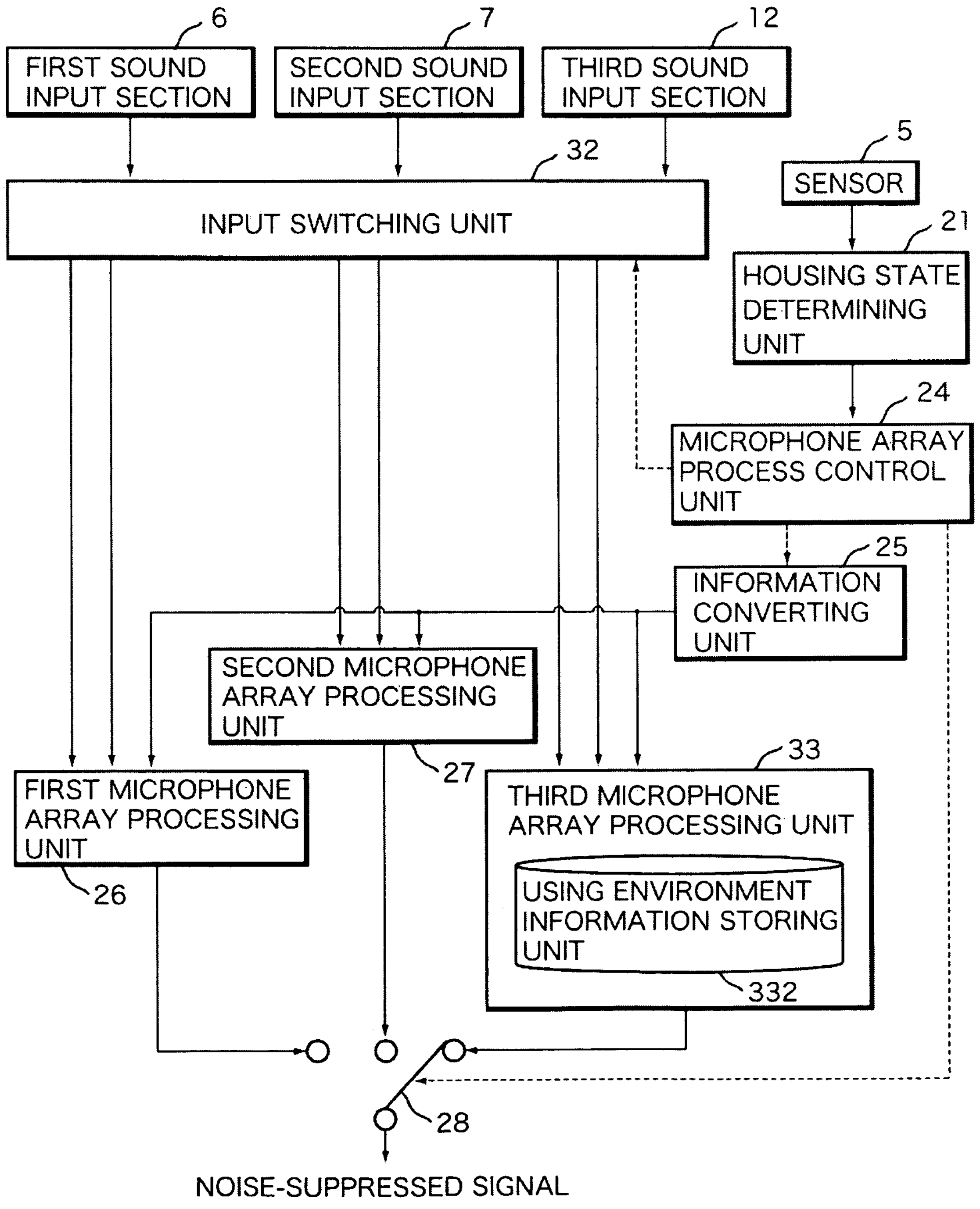
FIG. 20 is a functional block diagram depicting an example of a functional configuration of a mobile phone according to Embodiment 6.

FIG. 20 is a functional block diagram depicting a functional configuration of the mobile phone 1 according to Embodiment 6. In the mobile phone 1 according to Embodiment 6, the computation unit 2 has, in addition to the functions depicted in FIG. 18, the function of a third microphone array processing unit 33. The third microphone array processing unit 33 has the similar configuration as that of each of the first microphone array processing unit 26 and the second microphone array processing unit 27 depicted in FIG. 4.

The mobile phone 1 according to Embodiment 6 is configured to be able to select speech communication and television telephone communication. The mobile phone 1 according to Embodiment 6 transmits only an audio signal to a mobile telephone of an intended party. When the television telephone communication is selected, the mobile phone 1 according to Embodiment 6 transmits an audio signal along with an image signal obtained by photographing performed by a camera (not depicted) arranged on the mobile phone 1 to the mobile phone of the intended party.

Information representing the speech communication or the television telephone communication is inputted to the microphone array process control unit 24 according to Embodiment 6. The microphone array process control unit 24 determines whether the style is the normal style, the viewer style, or the television telephone style based on the information representing the speech communication or the television telephone communication and a usage pattern of the mobile phone 1 notified by the housing state determining unit 21. The microphone array process control unit 24 controls selection performed by the input switching unit 32 depending on the determined style to transmit sound signals from two sound input units of the sound input units 6, 7, and 12 to the microphone array processing unit 26 (or 27 or 33).

More specifically, when it is determined that the normal style is set, the microphone array process control unit 24 controls the input switching unit 32 to transmit sound signals from the sound input units 6 and 7. When the microphone array process control unit 24 is notified that the viewer style is set, the microphone array process control unit 24 controls the input switching unit 32 to transmit the sound signals from the sound input units 6 and 12 to the second microphone array processing unit 27. Furthermore, when it is determined that the television telephone style is set, the microphone array process control unit 24 controls the input switching unit 32 to transmit the sound signals from the sound input units 6 and 12 to the third microphone array processing unit 33.

When sound signals are inputted from the two sound input units, each of the microphone array processing units 26, 27, and 33 execute a microphone array process using environment information stored in each of the using environment information storing units 262, 272 and 332 to transmit the sound signal the noise of which is suppressed to a given destination through the switch 28.

Figure 21A:
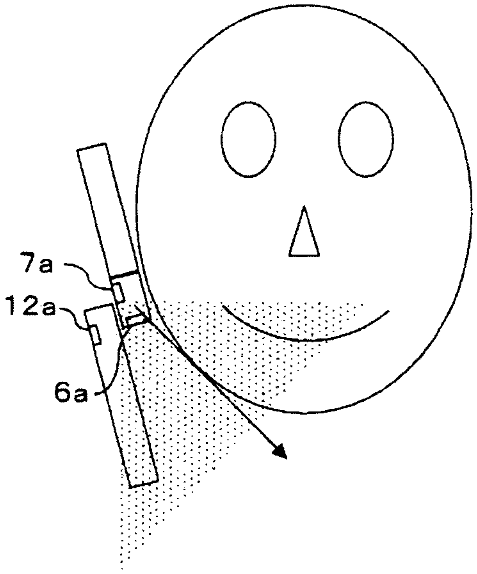
FIGS. 21A and 21B are schematic diagrams each depicting an example of a pattern of directivity in the mobile phone according to Embodiment 6.
Figure 21B:
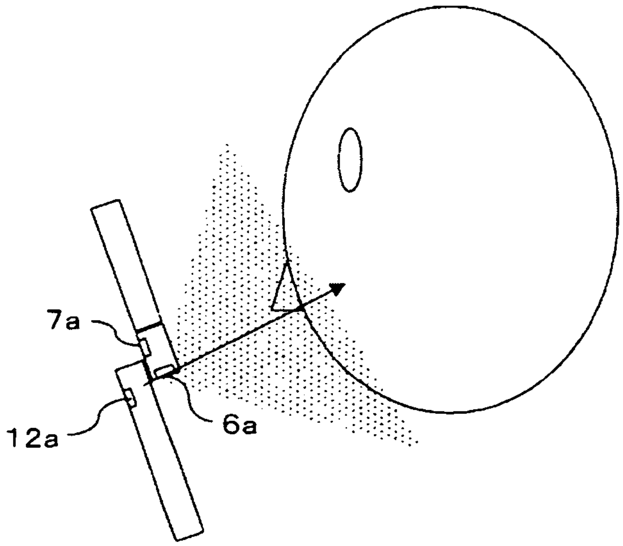

With the above configuration, the mobile phone 1 according to Embodiment 6 may obtain directivity patterns as depicted in FIGS. 21A and 21B. FIGS. 21A and 21B are schematic diagrams each depicting a pattern of directivity in the mobile phone according to Embodiment 6. In the mobile phone 1 according to Embodiment 6, in the normal style, as depicted in FIG. 21A, a sound including a cone-shaped directivity pattern including a line connecting the two microphones 7*a* and 6*a* to each other as a center line may be received, and noise suppression is performed such that a dead space of directivity is formed on a side surface side on which the microphone 7*a* is arranged.

In the television telephone style, as depicted in FIG. 21B, a sound including a cone-shaped directivity pattern including a line connecting the two microphones 12*a* and 6*a* to each other as a center line may be received, and noise suppression is performed such that a dead space of directivity is formed on a side surface side on which the microphone 12*a* is arranged. In the viewer style, the directivity pattern depicted in FIG. 19B is obtained.

In the mobile phone 1 according to Embodiment 6, the microphone array processing units 26, 27, and 33 to be executed are switched not only by a change of housing states such as the normal style and the viewer style but also by a change of sound input styles such as the speech communication and the television telephone communication. Therefore, even though the sound input styles are switched, an optimum microphone array process may be executed. The mobile phone 1 according to Embodiment 6, as depicted in FIGS. 21A and 21B, forms a cone-shaped directivity pattern which does not form a directivity pattern in a direction opposing the direction to a target sound source (mouth of a speaker) regardless of the usage patterns. For this reason, in any usage pattern, the performance of the noise suppressing process is not deteriorated.

Since the noise suppressing process performed by the mobile phone 1 according to Embodiment 6 performs the similar process as the process described in Embodiment 1, a description thereof will not be given. In the processes in operations S1 and S5 in the operation chart depicted in FIG. 8, the computation unit 2 (microphone array process control unit 24) according to Embodiment 6 determines whether the usage pattern is the normal style, the viewer style, or the television telephone style. More specifically, the microphone array process control unit 24 determines which usage patterns is used based on the housing state of the mobile phone 1 notified by the housing state determining unit 21 and information representing the speech communication or the television telephone communication.

Embodiment 7

A mobile phone according to Embodiment 7 will be described below. Since the mobile phone according to Embodiment 7 is preferably realized by the similar configuration as that of the mobile phone 1 according to Embodiment 1, like reference numerals denote like configurations, and a description thereof will not be given.

The mobile phone 1 according to Embodiments 1 to 6 has a configuration in which each of the microphone array processing units 26, 27, and 33 has the using environment information storing units 262, 272 and 332. More specifically, when the usage patterns of the mobile phone 1 are changed, the information converting unit 25 reads using environment information from the using environment information storing unit 262 (or 272, 332) of the microphone array processing unit 26 (or 27 or 33) corresponding to the usage pattern before the usage patterns are changed to give the using environment information to the microphone array processing unit 27 (or 26 or 33) corresponding to the usage patterns after the usage patterns are changed. In contrast to the above, the mobile phone 1 according to Embodiment 7 has a configuration in which each of the microphone array processing units 26, 27, and 33 does not include the using environment information storing units 262, 272 and 332.

Figure 22:
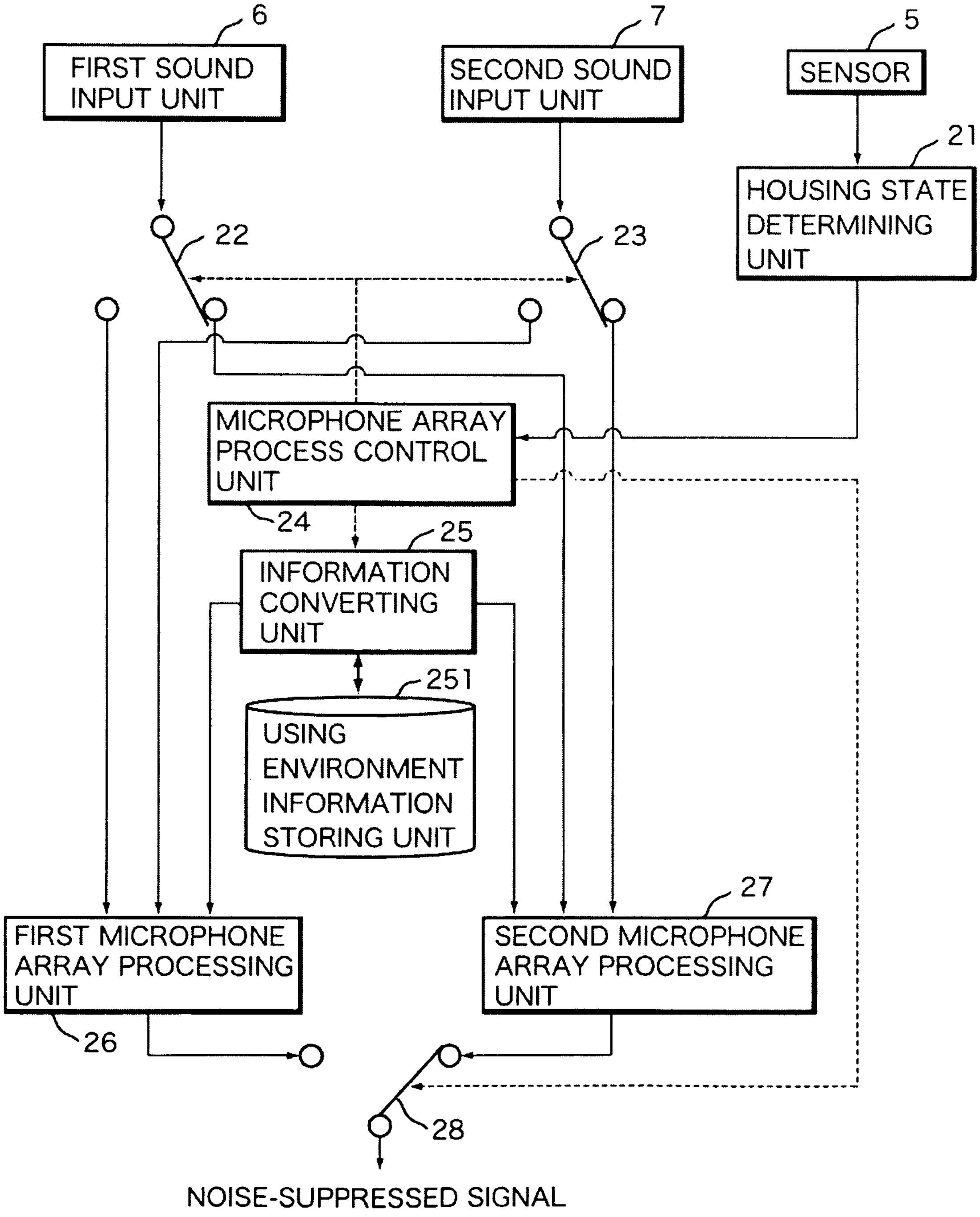
FIG. 22 is a functional block diagram depicting an example of a functional configuration of a mobile phone according to Embodiment 7.

FIG. 22 is a functional block diagram depicting a functional configuration of the mobile phone 1 according to Embodiment 7. In the mobile phone 1 according to Embodiment 7, the computation unit 2 has the similar functions as those in FIG. 3, and a using environment information storing unit (storing unit) 251 is connected to the information converting unit 25. As the using environment information storing unit 251, for example, a given area of the RAM 4 may be used, and an additionally arranged memory unit may be used. The microphone array processing units 26 and 27 include the similar configuration as that in FIG. 4. However, the microphone array processing units 26 and 27 do not include the using environment information storing units 262 and 272.

The information converting unit 25 according to Embodiment 7 sequentially acquires pieces of using environment information estimated by the microphone array processing units 26 and 27 and stores the pieces of using environment information in the using environment information storing unit 251. When the pieces of using environment information are stored in the using environment information storing unit 251, the information converting unit 25 may store the pieces of using environment information in association with pieces of information to identify the microphone array processing units 26 and 27 which estimate the pieces of using environment information, or may convert the pieces of using environment information into pieces of using environment information for a usage pattern corresponding to the given usage pattern and then store the same. The configuration of the information converting unit 25 is not limited to the configuration in which the pieces of using environment information estimated by the microphone array processing units 26 and 27 are sequentially stored in the using environment information storing unit 251. The information converting unit 25 may have a configuration in which using environment information is stored in the using environment information storing unit 251 when the usage patterns of the mobile phone 1 are changed.

The information converting unit 25 reads the using environment information stored in the using environment information storing unit 251 to give the using environment information to the microphone array processing unit 26 (or 27) according to an instruction from the microphone array process control unit 24. More specifically, the information converting unit 25 gives the using environment information to the first microphone array processing unit 26 in use in the normal style and gives the using environment information to the second microphone array processing unit 27 in use in the viewer style. When the information converting unit 25 gives the pieces of using environment information read from the using environment information storing unit 251 to each of the microphone array processing units 26 and 27, the information converting unit 25 performs a conversion process to the pieces of using environment information corresponding to the microphone array processing units 26 and 27 as needed.

With such a configuration, in the mobile phone 1 according to Embodiment 7, the pieces of using environment information estimated by the plurality of microphone array processing units 26 and 27 are uniformly managed in the using environment information storing unit 251. Therefore, in the mobile phone 1 including a configuration including three or more microphone array processing units, a transmitting process for the using environment information may be simplified.

More specifically, in the configuration including the three microphone array processing units 26, 27, and 33 as in the mobile phone 1 according to Embodiment 6, any one of the microphone array processing unit 26 (or 27 or 33) must give any one of the using environment information to the microphone array processing unit 27 (or 26 or 33) depending on the usage pattern before the usage patterns are changed and the usage pattern after the usage patterns are changed. However, in the mobile phone 1 according to Embodiment 7, since the using environment information read from the using environment information storing unit 251 may be transmitted to any one of the microphone array processing units, the process may be simplified.

Since the noise suppressing process performed by the mobile phone 1 according to Embodiment 7 performs the similar process as described in Embodiment 1, a description thereof will not be given. In the process in operation S7 in the operation chart depicted in FIG. 8, the computation unit 2 (information converting unit 25) according to Embodiment 7 performs a process of giving the using environment information read from the using environment information storing unit 251 to the microphone array processing unit 26 (or 27) corresponding to the usage pattern after the usage patterns are changed.

Embodiment 8

Figure 23A:
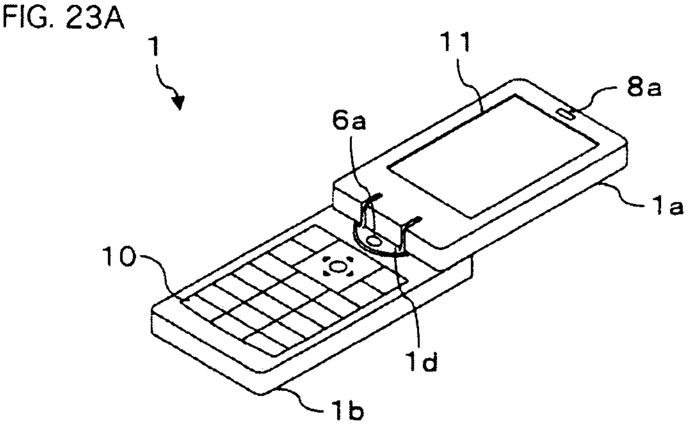
FIGS. 23A, 23B and 23C are schematic diagrams each depicting an example of a configuration of a mobile phone according to Embodiment 8.
Figure 23B:
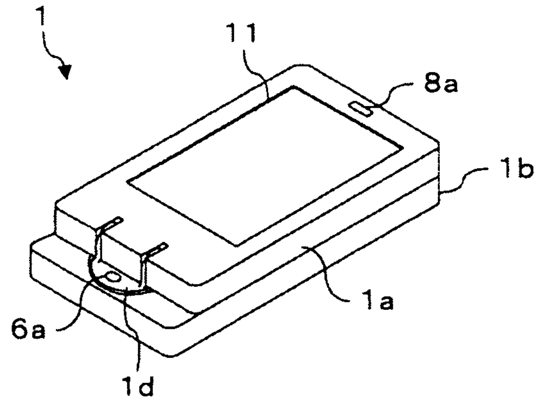
Figure 23C:
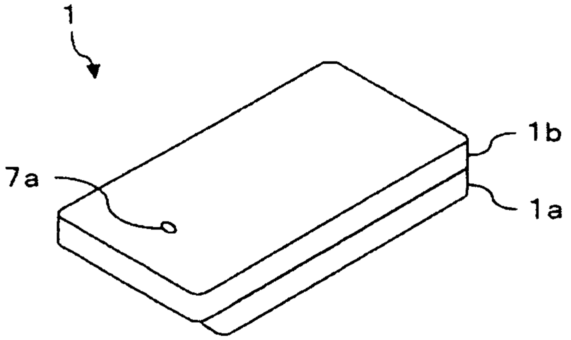
Figure 24:
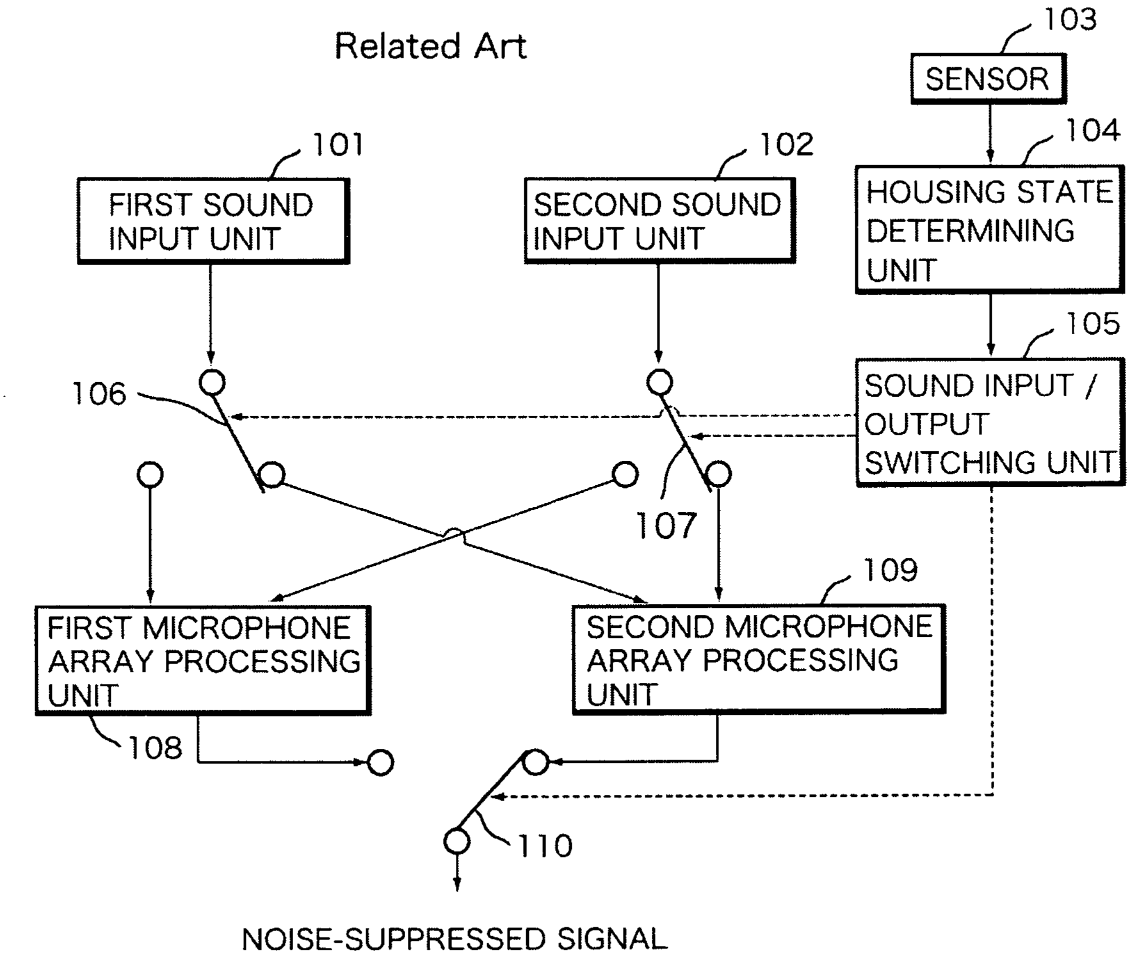
FIG. 24 is a block diagram depicting an example of a configuration of a conventional noise suppressing device.

A mobile phone according to Embodiment 8 will be described below. Embodiment 8 describes a modification of an appearance of the mobile phone 1 according to Embodiments 1 to 7. FIGS. 23A, 23B and 23C are schematic diagrams each depicting a configuration of the mobile phone according to Embodiment 8. FIG. 23A is an external perspective view of the mobile phone 1 in an unfolded state, FIG. 23B is an external perspective view of the mobile phone 1 in a folded state when viewed from the housing 1*a* side, and FIG. 23C is an external perspective view of the mobile phone 1 in the folded state when viewed from the housing 1*b* side.

In the mobile phone 1 according to Embodiment 8, the first housing 1*a* including the display unit 11 and the second housing 1*b* including the operation unit 10 are connected to each other through the hinge portion 1*d*. The hinge portion 1*d* may be pivotable at 180° about the housing 1*b* by using a vertical direction in FIGS. 23A, 23B, and 23C as a pivotal axis. As depicted in FIG. 23A, the state of the mobile phone 1 may be changed into a state in which the operation unit 10 is opened as depicted in FIG. 23A and a state in which the operation unit 10 is closed as depicted in FIG. 23B. In the mobile phone 1 according to Embodiment 8, the microphone 6*a* is arranged on the hinge portion (movable portion) 1*d*, and the microphone 7*a* is arranged on a surface opposing the surface on which the operation unit 10 of the housing 1*b* is arranged.

In this manner, by arranging the microphone 6*a* on the pivotal hinge portion 1*d*, in the mobile phone 1 according to Embodiment 8, a microphone array process using the two microphones 6*a* and 7*a* may be performed in use in the normal style or in use in the viewer style.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. A noise suppressing device which receives sound signals through at least two sound-receiving units and suppresses noise components included in the input sound signals while a current using environment information is being taken, the noise suppressing device comprising:

a detecting unit which detects a usage pattern of the noise suppressing device among a plurality of usage patterns in which positional relationships of the at least two sound-receiving units and/or positional relationships between the plurality of sound-receiving units and a target sound source are different from each other;

a converting unit which converts using environment information used in a noise suppressing process to each of the sound signals received by the at least two sound-receiving units into using environment information in accordance with a usage pattern detected by the detecting unit both before and after usage patterns change; and a suppressing unit which performs the noise suppressing process using the using environment information converted by the converting unit to the sound signals, further comprising an estimating unit which estimate the current using environment information in accordance with a current usage pattern, wherein the converting unit converts using the environment information representing a using environment estimated by the estimating unit into using environment information in accordance with the usage pattern detected by the detecting unit, further comprising a storing unit which stores pieces of the using environment information representing the using environments in accordance with the usage pattern estimated by the estimating unit as associating with the usage pattern;

wherein the converting unit converts the using environment information stored in the storing unit into current using environment information in accordance with the usage pattern detected by the detecting unit, wherein the suppressing unit performs the noise suppressing process while the current using environment information is being taken, wherein the suppressing unit performs the noise suppressing process with the current using environment information immediately after the usage patterns change, wherein the using environment information is information including at least one of a background noise level, statistic values of a background noise spectrum, information representing speech sections and noise sections, direction information representing a direction to a given sound source, direction information representing a direction to a noise source, an Signal to Noise ratio, and a correction value to correct a variation of sensitivities of the plurality of sound-receiving units.

2. The noise suppressing device according to claim 1, wherein the estimating unit estimates a background noise level and/or a background noise spectrum by using noise sections in the sound signals received by the sound-receiving units and information of the speech sections and the noise sections, in accordance with the usage pattern detected by the detecting unit and estimates a background noise level and/or a background noise spectrum corresponding to a usage pattern which is not a present usage pattern by using the information of the speech section and the noise section estimated to the present usage pattern.

3. The noise suppressing device according to claim 1, further comprising:

a calculating unit which calculates Signal to Noise ratios (S/NR) of sound signals subjected to a noise suppressing process by the suppressing unit and/or amounts of suppression in the noise suppressing process by the suppressing unit in accordance with usage patterns;

a comparing unit which compares the Signal to Noise ratios and/or the amounts of suppression calculated in accordance with usage patterns; and a notifying unit which notifies a comparison result to outside; wherein the estimating unit estimates using environments corresponding to the usage patterns based on the sound signals inputted to the sound-receiving units, and the suppressing unit performs a noise suppressing process to the sound signals by using pieces of using environment information representing the using environments corresponding to the usage patterns estimated by the estimating unit.

4. The noise suppressing device according to claim 1, wherein the usage patterns of the sound-receiving units are selectable each other, and the noise suppressing device further comprising:

a direction information storing unit which stores pieces of direction information representing directions to given sound sources as associating with the usage patterns of the sound-receiving units, wherein the suppressing unit performs the noise suppressing process depending on the usage patterns by using the direction information stored as associating with the usage patterns of the sound-receiving unit detected by the detecting unit.

5. The noise suppressing device according to claim 1, further comprising a selecting unit which selects a plurality of sound-receiving units in accordance with the usage patterns, wherein the noise suppressing device includes at least three sound-receiving units, and the suppressing unit performs the noise suppressing process to a sound signal inputted to the selected sound-receiving units.

6. A mobile phone comprising:

a noise suppressing device according to claim 1; wherein a plurality of sound-receiving units included in the noise suppressing device are microphones.

7. The mobile phone according to claim 6, further comprising a housing including a movable portion on which at least one of the sound-receiving units is arranged, wherein the movable portion is moved to change arrangement positions of the plurality of sound-receiving units.

8. A noise suppressing method in which a noise suppressing device causing a computer to receive sound signals through at least two sound-receiving units suppresses noise components included in the input sound signals while a current using environment information is being taken, the noise suppressing method causing a computer to execute:

being used in a plurality of usage patterns in which positional relationships of the at least two sound-receiving units and/or positional relationships between the plurality of sound-receiving units and a target sound source are different from each other;

detecting a usage pattern when a sound is received;

converting using environment information used in a noise suppressing process to the sound signal received by the at least two sound-receiving units into using environment information in accordance with the detected usage pattern both before and after usage patterns change;

performing a noise suppressing process using the converted using environment information to the sound signal;

estimating a current using environment information in accordance with a current usage pattern, where the converting converts using the environment information representing a using environment estimated by the estimating into using environment information in accordance with the usage pattern detected by the detecting; and storing pieces of the using environment information representing the using environments in accordance with the usage pattern estimated by the estimating as associating with the usage pattern, wherein the converting converts the using environment information stored in the storing unit into the current using environment information in accordance with the usage pattern detected by the detecting unit, wherein the suppressing unit performs the noise suppressing process while the current using environment information is being taken, wherein the suppressing performs the noise suppressing process with the current using environment information immediately after the usage patterns change, wherein the using environment information is information including at least one of a background noise level, statistic values of a background noise spectrum, information representing speech sections and noise sections, direction information representing a direction to a given sound source, direction information representing a direction to a noise source, an Signal to Noise ratio, and a correction value to correct a variation of sensitivities of the plurality of sound-receiving units.

9. A tangible and non-transitory computer-readable recording medium storing a computer program to cause a computer to function as a noise suppressing device which suppresses a noise component included in a sound signal obtained by receiving a sound while a current using environment information is being taken, the computer program comprising causing the computer to function as:

detecting a usage pattern when a sound is received;

converting using environment information used in a noise suppressing process to the sound signal into using environment information in accordance with the detected usage pattern both before and after usage patterns change; and performing a noise suppressing process using the converted using environment information to the sound signal;

estimating the current using environment information in accordance with a current usage pattern, where the converting converts using the environment information representing a using environment estimated by the estimating into using environment information in accordance with the usage pattern detected by the detecting; and storing pieces of the using environment information representing the using environments in accordance with the usage pattern estimated by the estimating as associating with the usage pattern, wherein the converting converts the using environment information stored in the storing unit into current using environment information in accordance with the usage pattern detected by the detecting unit, wherein the suppressing unit performs the noise suppressing process while the current using environment information is being taken, wherein the suppressing performs the noise suppressing process with the current using environment information immediately after the usage patterns change, wherein the using environment information is information including at least one of a background noise level, statistic values of a background noise spectrum, information representing speech sections and noise sections, direction information representing a direction to a given sound source, direction information representing a direction to a noise source, an Signal to Noise ratio, and a correction value to correct a variation of sensitivities of the plurality of sound-receiving units.

* * * * *